US011556348B2

(12) United States Patent
Kulick et al.

(10) Patent No.: US 11,556,348 B2
(45) Date of Patent: *Jan. 17, 2023

(54) BOOTSTRAPPING PROFILE-GUIDED COMPILATION AND VERIFICATION

(71) Applicant: Google LLC, Mountain View, CA (US)

(72) Inventors: Matthew E. Kulick, San Francisco, CA (US); Brian D. Carlstrom, Los Altos Hills, CA (US); David Sehr, Cupertino, CA (US)

(73) Assignee: Google LLC, Mountain View, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/181,296

(22) Filed: Feb. 22, 2021

(65) Prior Publication Data
US 2021/0173665 A1 Jun. 10, 2021

Related U.S. Application Data

(63) Continuation of application No. 16/410,491, filed on May 13, 2019, now Pat. No. 10,963,267, which is a
(Continued)

(51) Int. Cl.
G06F 8/41 (2018.01)
G06F 8/70 (2018.01)
(Continued)

(52) U.S. Cl.
CPC ............ G06F 9/4406 (2013.01); G06F 8/41 (2013.01); G06F 8/70 (2013.01); G06F 9/4451 (2013.01);
(Continued)

(58) Field of Classification Search
CPC ..... G06F 8/10; G06F 8/20; G06F 8/24; G06F 8/30; G06F 8/37; G06F 8/41; G06F 8/61;
(Continued)

(56) References Cited

U.S. PATENT DOCUMENTS 7,032,217 B2 4/2006 Wu
3,387,026 A1 2/2013 Hundt et al.
(Continued)

OTHER PUBLICATIONS

R. Gupta et al., Profile Guided Compiler Optimizations, The Compiler Design Handbook: Optimizations and Machine Code Generation. Sep. 2002. First Edition. Chapter 4. (Year: 2002).*
(Continued)

Primary Examiner — Wei Y Zhen
Assistant Examiner — Mohammed N Huda
(74) Attorney, Agent, or Firm — McDonnell Boehnen Hulbert & Berghoff LLP

(57) ABSTRACT

Apparatus and methods related providing application execution information (AEI) are provided. A server can receive a request to provide a software package for a particular software application. The server can determine composite AEI (CAEI) for the particular software application. The CAEI can include a composite list of software with data about software methods of the particular software application executed by a computing device other than the server. The server can extract particular AEI related to the particular software application from the CAEI. The particular AEI can provide compiler hints for compiling at least one software method predicted to be executed by the particular software application. The server can generate the software package, where the software package can include the particular software application and the particular AEI. The server can provide the software package.

20 Claims, 12 Drawing Sheets

Related U.S. Application Data continuation of application No. 15/636,574, filed on Jun. 28, 2017, now Pat. No. 10,338,932.

(60) Provisional application No. 62/422,556, filed on Nov. 15, 2016.

(51) Int. Cl.
*G06F 9/4401* (2018.01)
*G06F 9/445* (2018.01)
*G06F 9/455* (2018.01)
*G06F 8/30* (2018.01)
*H04L 67/10* (2022.01)

(52) U.S. Cl.
CPC .............. *G06F 9/4552* (2013.01); *G06F 8/37* (2013.01); *H04L 67/10* (2013.01)

(58) Field of Classification Search
CPC ... G06F 8/63; G06F 8/658; G06F 8/70; G06F 8/71; G06F 9/44; G06F 9/4406; G06F 9/4451; G06F 9/449; G06F 9/45; G06F 9/4552; G06F 9/4843; G06F 9/50; G06F 9/5011; G06F 9/5027; G06F 9/5044; G06F 9/5072; G06F 9/54; G06F 9/541; G06F 9/542; G06F 1/3203; G06F 21/445; G06F 21/6218; G06F 2221/2113; H04L 67/10; H04L 67/14; H04L 69/24; Y02D 10/22; Y02D 10/24; Y02D 10/36; Y02D 10/42
USPC ........................................................ 717/140
See application file for complete search history.

(56) References Cited

U.S. PATENT DOCUMENTS

| | | | |
|---|---|---|---|
| 3,423,980 A1 | 4/2013 | Ramasamy et al. | |
| 9,081,587 B1 | 7/2015 | Li et al. | |
| 2002/0029357 A1 | 3/2002 | Charnell et al. | |
| 2003/0050932 A1* | 3/2003 | Pace et al. | H04L 67/10 709/999.1 |
| 2003/0066060 A1 | 4/2003 | Ford | |
| 2005/0289264 A1* | 12/2005 | Lllowsky et al. | G06F 8/41 717/173 |
| 2012/0304154 A1* | 11/2012 | Cabillic et al. | G06F 8/41 717/146 |
| 2013/0031536 A1* | 1/2013 | De et al. | G06F 9/4552 717/146 |
| 2013/0031563 A1* | 1/2013 | De et al. | G06F 9/4552 717/146 |
| 2014/0298307 A1 | 10/2014 | Johnson et al. | |
| 2016/0092183 A1 | 3/2016 | Radigan | |
| 2018/0136941 A1 | 5/2018 | Kulick et al. | |

OTHER PUBLICATIONS

W. Wogerer, "A Survey of Static Program Analysis Techniques", Oct. 18, 2005, Technische Universit at Wien, Vienna, Austria. (Year: 2005).*

Apple Inc, "Using Profile Guided Optimization", Sep. 17, 2014, available via the Internet at developer.apple.com/library/content/documentation/DeveloperTools/Conceptual/xcode_profile_guided_optimization/pgo-using/pgo-using.html (last visited Sep. 2, 2016), 2 pages.

H. Brais, "Compilers—Managed Profile-Guided Optimization Using Background JIT", Mar. 2016, available via the Internet at msdn.microsoft.com/en-us/magazine/mt683795.aspx (last visited Sep. 2, 2016), 12 pages.

B. Burg, "Exploiting the collective wisdom of web application executions", Jun. 6, 2011, 32nd ACM Conference on Programming Language Design and Implementation, available via the Internet at engineering.purdue.edu/~milind/oldi11fit/burg.pdf (last visited Sep. 2, 2016), 1 page.

Ebrahim, "JIT Compiler for C, C++, and the likes", Dec. 23, 2010, available via the Internet at softwareengineering.stackexchange.com/questions/29344/jit-compiler-for-c-c-and-the-likes (last visited Sep. 2, 2016), 3 pages.

Google Inc., "Implementing ART Just-In-Time (JIT) Compiler", Aug. 29, 2016, available via the Internet at source. android.com/devices/tech/dalvik/jit-compiler (last visited Aug. 29, 2016), 6 pages.

Google Inc., "Profile-guided JIT/AOT Compilation", Aug. 29, 2016, available via the Internet at developer.android.com/about/versions/nougat/android-7.0.html#quick_path_to_app_install (last visited Aug. 29, 2016), 1 page.

R. Gupta et al., "Profile Guided Compiler Optimizations", The Compiler Design Handbook: Optimizations and Machine Code Generation, Sep. 2002, First Edition, Chapter 4, 36 pages.

Microsoft, "Profile-Guided Optimizations", Jun. 19, 2016, available via the Internet at web.archive.org/web/20160619115906/https://msdn.microsoft.com/en-us/library/e7k32f4k.aspx (last visited Jul. 10, 2017), 3 pages.

Microsoft, "Walkthrough: Using Profile-Guided Optimizations", Jan. 1, 2016, available via the Internet at msdn.microsoft.com/en-us/library/windows/apps/xct6db7f(v=vs.90).aspx (last visited Sep. 2, 2016), 11 pages.

M. Reshadi, "What do Compilation Strategies Have to Do with Web Content Delivery?", Oct. 14, 2014, available via the Internet at www.instartlogic.com/blog/compilation-strategies-web-content-delivery (last visited Sep. 2, 2016), 10 pages.

Wikimedia Foundation, "Profile-guided optimization", Aug. 9, 2016, available via the Internet at en.wikipedia.org/w/index.php?title=Profile-guided_optimization&oldid=733737834 (last visited Sep. 2, 2016), 2 pages.

W. Wogerer, "A Survey of Static Program Analysis Techniques", Oct. 18, 2005, Technische Universitat Wien, Vienna, Austria, 16 pages.

* cited by examiner

```
// Application App1, version V1
class A {
  void Ainit(...) {...}
  void M_A1(...) {...}
  void M_A2(...) {...}
  ...
}
class B {
  void Binit(...) {...}
  void M_B1(...) {...}
  void M_B2(...) {...}
  ...
}
main(...){
  A InstA;
  B InstB;
  ...
}
```

Software Application 110

```
Start Fingerprint
name = App1;
version = V1;
OS = OS1.3.4;
date = 1/1/2016;
AllowAEIAccess = YES;
...
End Fingerprint Start InitialMethodList
A.Ainit;
B.Binit;
...
End InitialMethodList Start HotMethodList
A.M_A1;
B.M_B1;
...
End HotMethodList
...
```

Fingerprint Information 122

Stored AEI 124

Application Execution Information (AEI) 120

Computing Device 102

FIG. 1

Server Computing Device 210

Fingerprint Info 410 | Stored Application Execution Information 420 | Composite AEI 212

| App Name 412 | App Version 414 | App OS Version 416 | AEI Type 422 | Method Name 424 | Memory Info 426 | Power Info 428 | Virt. Info 430 | Hierarchy Info 432 | Env Info 434 | API Info 436 | |
|---|---|---|---|---|---|---|---|---|---|---|---|
| App1 | V1 | 1.1.1 | Initial method | A.AInit | | | | | | | 450 |
| App1 | V1 | 1.1.1 | Hot method | B.M_B2 | | | | | | | 452 |
| App1 | V2 | 1.3.2 | Memory | | 1.664 MB | | | | | | 454 |
| App2 | 6.1 | 2.0.0 | Power | | | 0.33 Wh | | | | | 456 |
| App1 | V1 | 1.1.2 | Virt | B.M_B1 | | | Devirt | | | | 458 |
| App1 | V1 | 1.1.1 | Hier | A.AInit | | | | A -> AInit; M_A1; M_A2 | | | 460 |
| App1 | V1 | 1.1.1 | Env | | | | | | Phone | | 462 |
| App1 | V1 | 1.1.1 | API | Class A | | | | | | MenuA | 464 |

FIG. 4

BOOTSTRAPPING PROFILE-GUIDED COMPILATION AND VERIFICATION

CROSS-REFERENCE TO RELATED APPLICATIONS

This patent application is a continuation of U.S. patent application Ser. No. 16/410,491, entitled "Bootstrapping Profile-Guided Compilation and Verification," filed on May 13, 2019, which claims priority to U.S. patent application Ser. No. 15/636,574, now U.S. Pat. No. 10,338,932, entitled "Bootstrapping Profile-Guided Compilation and Verification," filed on Jun. 28, 2017, which claims priority to U.S. Provisional Patent Application No. 62/422,556 entitled "Bootstrapping Profile-Guided Compilation and Verification," filed on Nov. 15, 2016, the contents of all of which are entirely incorporated herein by reference for all purposes.

BACKGROUND

A computing device can have an operating system that supports essential functionality for using the computing device, such as scheduling tasks, executing software, and managing hardware and software resources of the computing device. In some examples, the operating system can include a runtime system that enables execution of software applications on the particular computing device. In particular examples, the runtime system can include compiler and/or interpreter software for converting application software into machine language instructions that can be directly executed by the computing device to perform one or more relatively low-level operations.

For example, the runtime system can support a virtual machine, where application software can be converted into one or more bytecodes. A bytecode is an instruction that performs one or more relatively low-level operations; e.g., memory loads and stores, register operations, and basic numerical operations. However, a bytecode may not be directly executable by the computing device, unlike machine language instructions.

To bridge the gap between bytecodes and machine-language instructions, bytecodes can be compiled by the compiler software, where compilation involves converting the bytecodes into machine-language instructions that can be executed by the computing device. Another technique for executing bytecodes includes interpreting the bytecodes using interpreter software, which can be software executable on the computing device that can perform operations as specified by the bytecodes. Typically, bytecodes that have been compiled into machine-language instructions can be executed faster than interpreted bytecodes.

SUMMARY

In one aspect, a method is provided. A server computing device receives a request to provide a software package for a particular software application. The server computing device determines composite application execution information (AEI) for at least the particular software application. The composite AEI includes a composite list of software for at least the particular software application. The composite list of software includes data about one or more software methods of the particular software application executed by at least one computing device other than the server computing device. The server computing device extracts particular AEI related to the particular software application from the composite AEI. The particular AEI provides one or more compiler hints for compiling at least one method of a list of software methods predicted to be executed by the particular software application. The particular AEI includes a list of software methods executed by the particular software application. The server computing device generates the software package, where the software package includes the particular software application and the particular AEI. The server computing device provides the software package.

In another aspect, a computing device is provided. The computing device includes one or more processors; and data storage including at least computer-executable instructions stored thereon that, when executed by the one or more processors, cause the computing device to perform functions. The functions include: receiving a request to provide a software package for a particular software application; determining composite AEI for at least the particular software application, the composite AEI including a composite list of software for at least the particular software application, where the composite list of software includes data about one or more software methods of the particular software application executed by at least one computing device other than the computing device; extracting particular AEI related to the particular software application from the composite AEI, the particular AEI providing one or more compiler hints for compiling at least one method of a list of software methods predicted to be executed by the particular software application; generating the software package, where the software package includes the particular software application and the particular AEI; and providing the software package.

In another aspect, a non-transitory computer readable medium is provided. The non-transitory computer readable medium has stored thereon instructions, that when executed by one or more processors of a computing device, cause the computing device to perform functions. The functions include: receiving a request to provide a software package for a particular software application; determining composite AEI for at least the particular software application, the composite AEI including a composite list of software for at least the particular software application, where the composite list of software includes data about one or more software methods of the particular software application executed by at least one computing device other than the computing device; extracting particular AEI related to the particular software application from the composite AEI, the particular AEI providing one or more compiler hints for compiling at least one method of a list of software methods predicted to be executed by the particular software application; generating the software package, where the software package includes the particular software application and the particular AEI; and providing the software package.

In another aspect, a computing device is provided. The computing device includes: means for receiving a request to provide a software package for a particular software application; means for determining composite AEI for at least the particular software application, the composite AEI including a composite list of software for at least the particular software application, where the composite list of software includes data about one or more software methods of the particular software application executed by at least one computing device other than the computing device; means for extracting particular AEI related to the particular software application from the composite AEI, the particular AEI providing one or more compiler hints for compiling at least one method of a list of software methods predicted to be executed by the particular software application; means for generating the software package, where the software package includes the particular software application and the particular AEI; and means for providing the software package.

In another aspect, a system is provided: The system includes a first computing device and a server computing device. The first computing device includes one or more first processors and first data storage including at least computer-executable instructions stored thereon that, when executed by the one or more first processors, cause the first computing device to perform first functions. The first functions include: sending a request to provide a software package that includes software for a particular software application to the server computing device. The server computing device includes one or more server processors and server data storage including at least computer-executable instructions stored thereon that, when executed by the one or more server processors, cause the server computing device to perform server functions. The server functions include: receiving the request to provide the software package for the particular software application; determining composite AEI for at least the particular software application, the composite AEI including a composite list of software for at least the particular software application, where the composite list of software includes data about one or more software methods of the particular software application executed by at least one computing device other than the server computing device; extracting particular AEI related to the particular software application from the composite AEI, the particular AEI providing one or more compiler hints for compiling at least one software method of a list of software methods predicted to be executed by the particular software application; generating the software package, where the software package includes the particular software application and the particular AEI; and providing the software package.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 1 shows a software application and application execution information (AEI) for the software application for a scenario, in accordance with an example embodiment.

FIG. 4 illustrates composite AEI for the scenario of FIG. 1, in accordance with an example embodiment.

DETAILED DESCRIPTION

Figure 2:
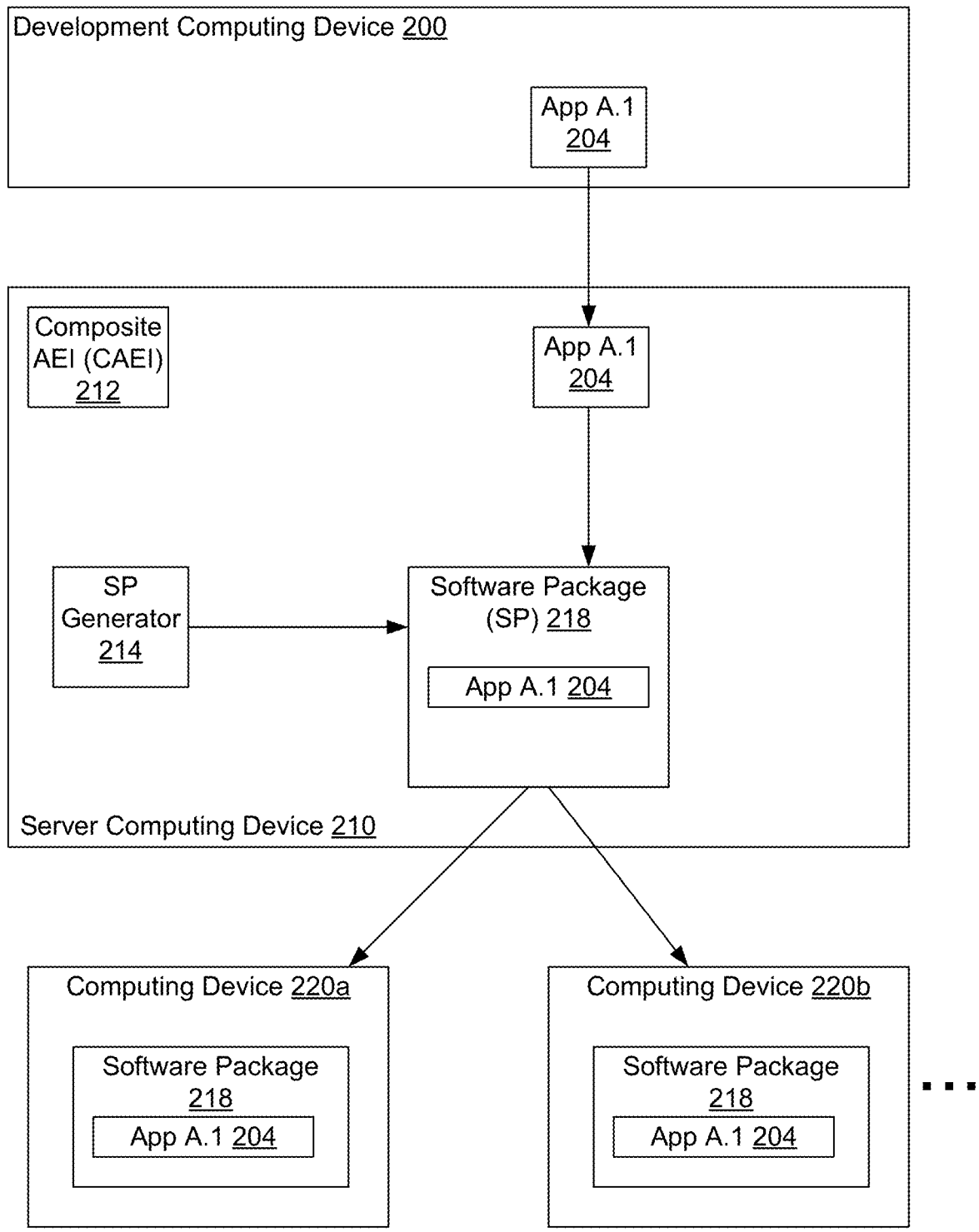
FIGS. 2 and 3 depict computing devices generating and distributing software packages that include AEI for the scenario of FIG. 1, in accordance with an example embodiment.

Techniques for Initializing Profiles for
Profile-Guided Compilation and Verification Disclosed herein are systems and methods for bootstrapping, or initializing, a runtime system of a computing device with application execution information (AEI). The runtime system can include one or more compilers, such as just-in-time (JIT) and/or ahead-of-time (AOT) compilers, and interpreters for executing software applications, including software applications written in the Java programming language and/or one or more other programming languages. For example, a runtime system can first use an interpreter to execute a software application. The software application can include one or more software classes that in turn include one or more software methods, or functions that can be executed in connection with the software class. Then, as execution continues, the runtime system can compile portions of the software application, such as "hot methods" or frequently-executed software methods of the software application, and/or software methods that are run during initialization of the software application.

The AEI can include data usable at different points during a software application's use cycle. As an example, AEI can provide compiler hints, or information that the compiler can use to direct and/or improve its performance and perhaps the performance of other software involved with the runtime system, such as installation, verification, and application execution software; i.e., compiler hints need not be restricted to use by the compiler. Example compiler hints can include a list of software classes and/or methods that should be compiled as soon as feasible during execution, as the software classes and/or methods on the list of software classes and/or methods can be predicted to be executed (i.e., are likely to be executed) by the software application; e.g., a list of hot software methods and/or software methods run during initialization of the software application. Then, the compiler and/or the runtime system can determine that at least some of the methods on the list of software methods can be compiled before or during runtime (rather than interpreted during runtime) and/or be compiled with one or more optimization techniques. For example, the compiler can determine that some or all hot methods on the list of software methods are to be compiled before runtime and that some or all initial methods on the list of software methods are to be compiled at runtime. As another example, the compiler can apply optimization techniques during compilation of methods listed as hot methods and/or initial methods. The AEI can also provide compiler hints related to memory and/or register allocation, enabling the compiler and runtime system to better utilize memory and register resources. For example, AEI for a software application can include information about what portions of the software application to compile and verify during installation and execution; e.g., information related to one or more software classes and/or methods to be compiled.

AEI for a software application can include compiler hints related to run time execution by the runtime system. For example, the AEI can have information related to preparing classes for class loading either prior to or during runtime, so to reduce costs related to class loading. The AEI can also have information about actual use of application features, classes, user interface selections/menus, etc. during runtime. This information about runtime use of the application can both be used for compiler hints, such as hot method compiler hints discussed above, and for hints to improve later versions of the application. The later-version hints can indicate that a certain menu is frequently used and so can be optimized for easier and/or faster use by a user in a later version of the application. Many other examples of compiler and other hints are possible as well.

The runtime system can generate one or more machine-readable profiles that include AEI during application execution. For example, the runtime system can also build a profile of AEI for the software application over time, where the AEI can include a list of software methods that should be compiled as soon as feasible during execution; e.g., a list of hot methods and/or methods run during initialization of the software application.

Each time a software application is executed, the AEI can be used in verifying and executing the software application. Further the AEI can be updated to include information learned during the particular execution of the software application. In some cases, the AEI can be collected when the software application is executed and can be periodically "checkpointed" or saved to local storage, such as a (temporary) AEI file or memory buffer. Then, when the computing device is in a maintenance mode (e.g., in a mode where the device is unused, overnight, being charged, etc.), the checkpointed AEI can be aggregated or merged with other, previously collected AEI stored as composite AEI. Using compilers guided by AEI can enable fast startup times for software execution. Further, the use of AEI built up over time can further improve performance; e.g., by enabling profile-guided compilation of the software application.

However, waiting to build up AEI can increase power usage and/or latency, which can cause user-perceptible "jank" or sluggish performance/execution of the software application. Further, when a new version of the software application is installed, performance of the software can regress while waiting to generate AEI for the newly-installed version. In some cases, extraction and verification of the software application from a software package can be performed during application installation. In these embodiments, the runtime system can perform software extraction and verification for the entire software application at installation, which can increase installation time in comparison to an AEI-targeted extraction and verification procedure.

To improve installation, verification, and execution of a software application, a software package for installing the software application on the computing device can include one or more files that include already-determined AEI. The already-determined AEI can indicate portions of the software application that should be (and/or should not be) verified, installed, and/or compiled for better performance. The already-determined AEI can be supplemented by AEI generated during execution of the software application on the computing device, which can further enhance performance of the software application. By providing AEI at the time of installation, the amount of time required to wait for AEI to accumulate on the computing device is reduced or eliminated, enabling more intelligent and targeted install-time optimizations that can speed execution of the software application. In some examples, AEI can be delivered before the time of installation and then may be used or accessed during and after installation.

Along with AEI provided prior to application installation where the application is explicitly downloaded and installed onto a computing device, AEI can be delivered with and then used during and after installation of ephemeral applications. An ephemeral application is an application that may not require an explicit download prior to installation and/or be installed on a computing device for a relatively short period of time. For example, clicking a hyperlink related to an ephemeral application can cause the ephemeral application to be downloaded and installed; thus, the ephemeral application was not explicitly downloaded, but implicitly downloaded with content associated with the hyperlink. AEI delivered with the ephemeral application can be used to improve installation and performance of verification, installation, compilation, and execution of ephemeral applications, for at least the reasons discussed above.

A package manager, which can be a software component of the runtime system, can collect per-application profiles and provide them to other computing devices; e.g., by use of API methods or commands. In some embodiments, the package manager can provide profiles and/or AEI to other computing devices only if so authorized by the user; e.g., such authorization can be provided using opt-in and/or opt-out techniques.

A server computing device can be used by or be part of an application platform that provides an access point for users seeking to download software applications. Additionally, the server computing device can communicate with per-device package manager software to receive AEI and/or profiles provided by one or more devices executing a software application, merge the received AEI and/or profiles, and provide the merged AEI and/or profiles to other devices that utilize the software application. In some embodiments, the server computing device can have a server-side package manager to communicate with the package managers of computing devices providing profiles/AEI. In other embodiments, the server computing device can receive AEI and/or profiles on a periodic basis; e.g., hourly, daily, every two days, weekly, etc. In still other embodiments, the server computing device can receive AEI from one or more development computing devices used to develop and/or test the software application. That is, a developer of a software application can provide a software application and related AEI to the server computing device so that the related AEI can be used even before the software application is first executed by a computing device. The development computing devices can generate the AEI by executing/testing the software application, developer tooling of the software application, via an interactive development environment (IDE) configured to generate AEI, and/or by other techniques.

The AEI can be delivered in one or more formats, such as a machine-readable (i.e., binary) format, a human-readable format (e.g., a text file, in a markup-language file such as XML, HTML, etc.), or another format. In some embodiments, AEI can be expressed in different formats on different devices. In these embodiments, the runtime system can convert a format of a received AEI into a different format; e.g., from a human-readable format to a machine-readable format or vice versa. In some embodiments, AEI can be reported directly to system or application components and/or cloud services instead of using intermediate files, such as a profile containing AEI on a computing device.

In some examples, the AEI can also include information about application program interfaces (APIs) used during execution of the software application; then, verification of the software application can include verifying the presence of the correct software implementing the AEI-referred APIs on the computing device. For example, if the AEI indicates that the software application uses version 1.1.1 of an API to communicate with a software package SP111, then the runtime system can verify that software of SP111 implementing version 1.1.1 of the API is present on the computing device. The AEI can also include additional data or semantics to optimize loading, aggregation, and/or execution of a software application. For example, the AEI can include class hierarchy information related to the software application, information about memory used during execution of the software application, information about power consumed during execution of the software application, devirtualization information related to the software application, information about hardware of a computing device executing the software application, and/or other information.

The server computing device and/or the application platform can maintain a server-configurable list of applications to selectively request, collect, and receive useful profiles/AEI related to software applications on the list of applications. In some embodiments, a software application can have specific permissions enabled to communicate profiles and/or AEI with the server computing device. The server computing device and/or the application platform can merge received profiles/AEI in order to generate initial profiles with initial AEI that can be bundled into software packages used to install software applications.

The server computing device can maintain composite AEI (CAEI) to store received profiles/AEI. The composite AEI can be a database, or similar data entity, that stores both fingerprint information and AEI for one or more software applications. The fingerprint information can be used to identify a software application, and can include, but is not limited to, an application identifier (e.g., a name or reference number), an application version number or other identifying information, an operating system used to execute the application, and/or an operating system version number or other identifying information. Then, to generate a profile for a particular software application, the server computing device (or other computing device) can generate a query requesting AEI for a software application identified using fingerprint information and provide the query to the composite AEI. In response, the composite AEI can retrieve AEI related to the software application identified by the fingerprint information of the query and provide the retrieved AEI as part of a query response.

Once a profile/AEI are obtained for a software application, the profile/AEI can be bundled with code for the software application into a software package by the server computing device. Then, upon request for the software application, the server computing device can send the software package to a computing device requesting the software application—the computing device can then install the software and profile/AEI in the software package during software installation. Some or all versions of a software application can have their own profiles/AEI which can be keyed using the fingerprint information.

During software installation, a runtime system of an installing computing device can obtain a profile/AEI from a software package and place the profile/AEI into a bootstrap profile. The bootstrap profile can be used by the runtime system for optimizing verification and compilation of the software application. The package manager of the installing computing device can notify the server computing device and/or the application platform about any problems with the bootstrap profile; e.g., a problem in parsing the bootstrap profile, corruption of the bootstrap profile, failures during sanity checking of application software files. If the server computing device and/or the application platform receives more than a threshold number of errors, warnings and/or failures related to a particular bootstrap profile, the server computing device and/or the application platform can choose to stop including the particular bootstrap profile in software packages.

For example, suppose that a software application APP1 is initially executed by three computing devices: CD1, CD2, and CD3, and each of the computing devices generates respective profiles P1, P2, and P3 that each contain AEI for APP1. A server computing device 51 can receive profiles P1, P2, and P3, merge the AEI of the profiles to generate a new profile P_MERGE that includes AEI from some or all of the AEI generated during execution of APP1 by computing devices CD1, CD2, and CD3. Then, another computing device, CD4, can download a software package containing software for software application APP1 and profile P_MERGE, and create a bootstrap profile that includes the AEI in profile P_MERGE to enhance performance of software application APP1. A runtime system of computing device CD4 can then use the AEI in the bootstrap profile to guide compilation and optimize verification; e.g., the runtime system can read the P_MERGE file to obtain AEI to guide compilation and optimize verification for APP1.

A software life cycle can include: (i) executing software applications to generate AEI, (ii) obtaining and merging AEI for bootstrap profiles on new devices newly installing the software application, and (iii) using the bootstrap profiles on the new devices to execute the software applications and generate AEI on the new devices. This software life cycle can be repeated to obtain profiles/AEI from increasingly-larger numbers of computing device that executed the software application. In some embodiments, the runtime system, package manager, application platform, and/or server computing system can provide information about a merged profile, such as profile creation dates and data about how much new AEI is available in the latest merge. The data about new AEI can track whether the profile has "asymptoted", or reached a practical limit on contributing new profiling information.

By providing AEI for a software application before or during the time of installation of the software application, a runtime system installing, verifying, and/or executing will have access to relevant information about the software application that can be used during installation, verification, and execution of the software application. Having AEI available before or during the time of installation can improve performance of a software application without having to wait for AEI to accumulate by (repeatedly) executing the software application. Improving performance of the software application can enhance an end user's experience, by making the software application easier, more responsive, and more efficient for an end user. In some examples, AEI can be used to reduce resources used on a computing device during execution of an AEI-enabled application, enhancing both performance of the AEI-enabled application and other applications that have more resources available for their use. Further, AEI can be used to enhance an end user's experience of the installation of the software application by providing better verification, and so reducing the likelihood of undetected errors, during installation, and in at least some examples, speeding the installation of the software application.

The AEI provided before or during the time of installation can be a combination of crowdsourced information from other devices to provide an immediate, first-time performance boost for a new device that has never run this code before. Thus, even the most novice of users can take advantage of AEI generated by a variety of sources to enhance application performance. Also, the AEI can include verification-related information that can be provided by a server computing device without necessarily crowdsourcing the verification-related information; thus, non-crowdsourced AEI (e.g., AEI provided by a developer, tester, and/or other related entities) can be used to immediately increase performance of the software application. Additionally, providing AEI before or during the time of installation of a new version of an already-used software application, improvements in performance provided by AEI for an older version of the already-used software application can be maintained or even exceeded by the new version.

FIG. 1 shows software application 110 and AEI 120 for software application 110 used during scenario 100, in accordance with an example embodiment. In scenario 100, software application 110, which is named "App1" and initially has version "V1", is provided to computing device 102 and executed. AEI 120 for software application 110 is generated by computing device 102 during and after execution of software application 110.

Software application 110 includes two classes "A" and "B" that are instantiated during execution of a "main" routine as respective instances "InstA" and "InstB". Class A includes at least three methods: an "Ainit" method, a "M_A1" method, and a "M_A2" method, and class B includes at least three methods: a "Binit" method, a "M_B1" method, and a "M_B2" method.

AEI 120 includes fingerprint information 122 and stored AEI 124. As shown in FIG. 1, fingerprint information 122 includes information about various parameters related to the AEI, such as a "name" parameter of "App1" identifying software application 110, a "version" parameter of "V1" identifying a particular version of software application 110, an "OS" (operating system) parameter of "OS1.3.4" about an operating system used to execute software application 110, a "date" parameter of "1/1/16" indicating a date that AEI 120 was most recently updated, and an "AllowAEI-Access" parameter of "YES" enabling a package manager of computing device 102 to access and communicate AEI 120 to other computing devices. In other examples, the AllowAEIAccess parameter can be set to "NO" to disable access and communication of AEI 120 to other computing devices. In other scenarios, AEI 120 can include less, more, and/or different application execution information. In the example shown in FIG. 1, AEI 120 is shown in a human-readable/textual format. In other embodiments, AEI can be provided in a machine-readable/binary format.

AEI 120 can include data usable at different points of during a software application's use cycle. For example, AEI for a software application can include information about what portions of the software application to compile and verify during installation and execution, such as classes and/or methods of the software application. Stored AEI 124 includes an "InitialMethodList" that lists software methods used to initialize the "App1" software application. In some embodiments, methods listed in an initial method list such as provided by AEI 124 can be compiled by a JIT, AOT, or other compiler either before execution a software application or at the beginning of execution of the software application. Similarly, stored AEI 124 includes a "HotMethodList" that lists software methods that are frequently executed by the "App1" software application. In some embodiments, methods listed in a hot method list such as provided by AEI 124 can be compiled by a JIT, AOT, or other compiler either before or during execution a software application. As methods on a hot method list are frequently executed by a software application, compilation of these methods can speed execution of the software application. Then, the compiled initial and/or hot methods can be stored to speed initialization and execution of the software application.

In particular ones of these embodiments, a list of software methods that are frequently executed by the software application can include information about software classes frequently used by the software application, and so can indicate that an entire class be compiled to speed execution of the software application. In more particular of these embodiments, a heuristic can be applied to AEI to methods on a list of software methods that are frequently executed by the software application to determine frequently used classes. For example, each software class that has at least a predetermined threshold number of software methods (e.g., 2, 3, 5) and/or a predetermined threshold percentage of its software methods (e.g., 20%, 50%, 75%) can be considered to be a frequently used class. Then, once a class has been identified as a frequently used class, the list of software methods that are frequently executed by the software application can be updated to add information about the class now identified as a frequently used class.

In some embodiments, methods listed in AEI 120 can include devirtualization information that can be used as compiler hints. In these embodiments, some or all methods of a software application can be classified as direct methods or virtual methods. A direct method can be a method that has only has one implementation, while a virtual method is a method that has multiple implementations. For example, a method specified by a base class, or a class that has subclasses, can be implemented by the base class and one or more of its subclasses, and so is a virtual method. As another example, a method implemented by only one class is a direct method.

Also, an invocation or "call" of a software method can be performed by a virtual method call or a direct method call. A runtime system can make a virtual method call by first looking up a location of a particular implementation of a method in a data structure, such as a virtual method table. Then, once the location of the particular implementation of the method is found, the runtime system can begin executing software for the particular implementation of the method based the location; e.g., the runtime system can execute instructions stored in the location for the particular method. A direct method call can involve executing the method without use of the data structure/virtual method table. In some embodiments, virtual method calls can require that the runtime system use an interpreter to perform the virtual method call as the particular implementation can change at runtime, while software direct method calls can be compiled by a JIT, AOT, or other compiler and the carried out by the runtime system directly. As such, direct method calls are typically faster than virtual method calls.

Devirtualization of a particular method can include making a direct method call rather than a virtual method call for particular method. In some cases, direct method calls can be implemented using "inlining" or replacing the particular method call with a copy of a software implementation of the method. However, a virtual method call typically cannot be devirtualized when multiple implementations of the method can exist. In particular of these embodiments, a determination can be made at runtime whether or not a particular method can be devirtualized. AEI 120 can store the determination about whether or not the particular method can be devirtualized as devirtualization information. Then, on a subsequent execution of the software application, the devirtualization information in AEI 120 can be used to speed the determination whether a software method can be devirtualized.

In some examples, devirtualization can involve the use of "guards" or conditional statements that determine whether or not a particular method call is devirtualized. For example, a guard can involve an explicit check to determine whether the particular method call is valid for devirtualization; e.g., a check to determine whether multiple implementations of the particular method are loaded at runtime, and so devirtualization would be invalid. If a guard indicates that the particular method call is invalid for devirtualization, assumptions made in devirtualizing method calls can be corrected by using the interpreter to execute the particular method call. Example pseudo-code for a guard for devirtualization is shown in Table 1 below.

TABLE 1

```
// pseudo-code guard for devirtualization
if (particular method call is not valid) {
    deoptimize; // invalid, so need to deoptimize method call.
    // Deoptimization can involve setting up a call stack for
    // interpreter execution and calling the interpreter
    // to execute the particular method call as a
    // virtual method call.
}
do devirtualized virtual call; // if here, assumptions valid
```

In examples of devirtualization using guards such as shown in Table 1 above, AEI 120 can include information about which methods are called during execution and/or information about which method calls lead to deoptimization. Other AEI related to devirtualization is possible as well.

In examples not shown in FIG. 1, AEI 120 can include information about memory allocation of the "App1" software application, such as amounts of memory allocated to particular data items (e.g., data structures, objects, variables, arrays, lists, buffers) of the software application and/or an amount of memory allocated for the entire software application. Then, this memory information can be used by the runtime system to allocate memory prior to execution of the software application, and so avoid delays involved in allocating memory during execution. Also, the memory information can be used to allocate enough memory for application execution and avoid or reduce over-allocation of memory to the software application. Additionally, stored memory information in AEI 120 can aid debugging; e.g., if a particular execution of the software application indicates a "memory leak" or improper allocation/deallocation of memory, the amounts of memory and/or listed software methods recorded by AEI 120 for executions of the software application that do not involve the memory leak can be compared to amounts of memory and/or software methods executed when the memory leak is evident.

In other examples not shown in FIG. 1, AEI 120 can include other information about power usage by the "App1" software application, a computing environment (e.g., mobile computing device, automotive, desktop, etc.), class hierarchy information, and APIs used by the software application. This information, along with other information in AEI 120, can be used to install, validate, compile, and execute the software application. For example, suppose that AEI 120 indicates that the software application is executed using a particular version of an operating system, in a particular computing environment, and/or uses particular APIs. Then, if those data change on a subsequent execution of the application (e.g., the operating system has been upgraded, APIs have changed, and/or the software is executing in a different computing environment), then the application may not be validated, as to avoid improper execution of the application.

As another example, an application can support multiple versions or levels of an API simultaneously. Then, if the application is installed in a particular environment (e.g., a particular computing device executing a particular version of an operating system) with having an older version/level of the API, the application can include one or more references to a newer version/level of the API that do not exist in the particular environment.

Also, AEI 120 can include data that indicates whether one or more aspects (e.g., classes, methods, and/or API references) of the application are valid in the particular environment. For example, during verification of the application, a per-method check of the application can raise an error in verifying a particular method of the application. Then, depending on the error, a per-class check of the application can raise an error in verifying a particular class having the particular method of the application. In this case, AEI 120 can record which per-method and/or per-class checks raise errors (and/or do not raise errors) during verification. As such, a subsequent verification of the application can use AEI 120 to determine which methods and/or classes are expected to raise errors (and/or not raise errors) during verification, and so reduce or eliminate execution of the related per-class and/or per-method checks during verification.

Additionally, if class hierarchy information recorded in AEI 120 does not match a class hierarchy determined during installation, validation, and/or execution of the software application, the installation or validation of the software application may fail and/or the software application may throw an exception or otherwise indicate an error. Many other techniques for using AEI 120 to install, validate, compile, and/or execute a software application are possible as well.

FIG. 2 depicts computing devices 200, 210 generating and distributing software package 218 during scenario 100, in accordance with an example embodiment. Scenario 100 continues with development computing device 200 providing software application "App A.1" 204, which stands for Application A, Version 1, to server computing device 210. Server computing device 210 includes composite AEI (CAEI) 212 that stores AEI for one or more software applications—at this stage of scenario 100, no AEI is available for App A.1 204, so composite AEI 212 does not include AEI for App A.1. Server computing device 210 also includes software package (SP) generator 214 for generating software package 218, where software package 218 includes a copy of software application App A.1 204. After generating software package 218, server computing device 210 can distribute software package 218, and thus distribute software application App A.1 204, to computing devices 220a and 220b. Upon reception of software package 218, respective computing devices 220a and 220b can use installation software to install App A.1 204 and use a runtime system to execute App A.1 204. During execution of software application App A.1 204, each of computing devices 220a and 220b can generate AEI for App A.1 204. Upon generation of AEI for App A.1 204, each of computing devices 220a and 220b can save the generated AEI into a file of AEI.

Figure 3:
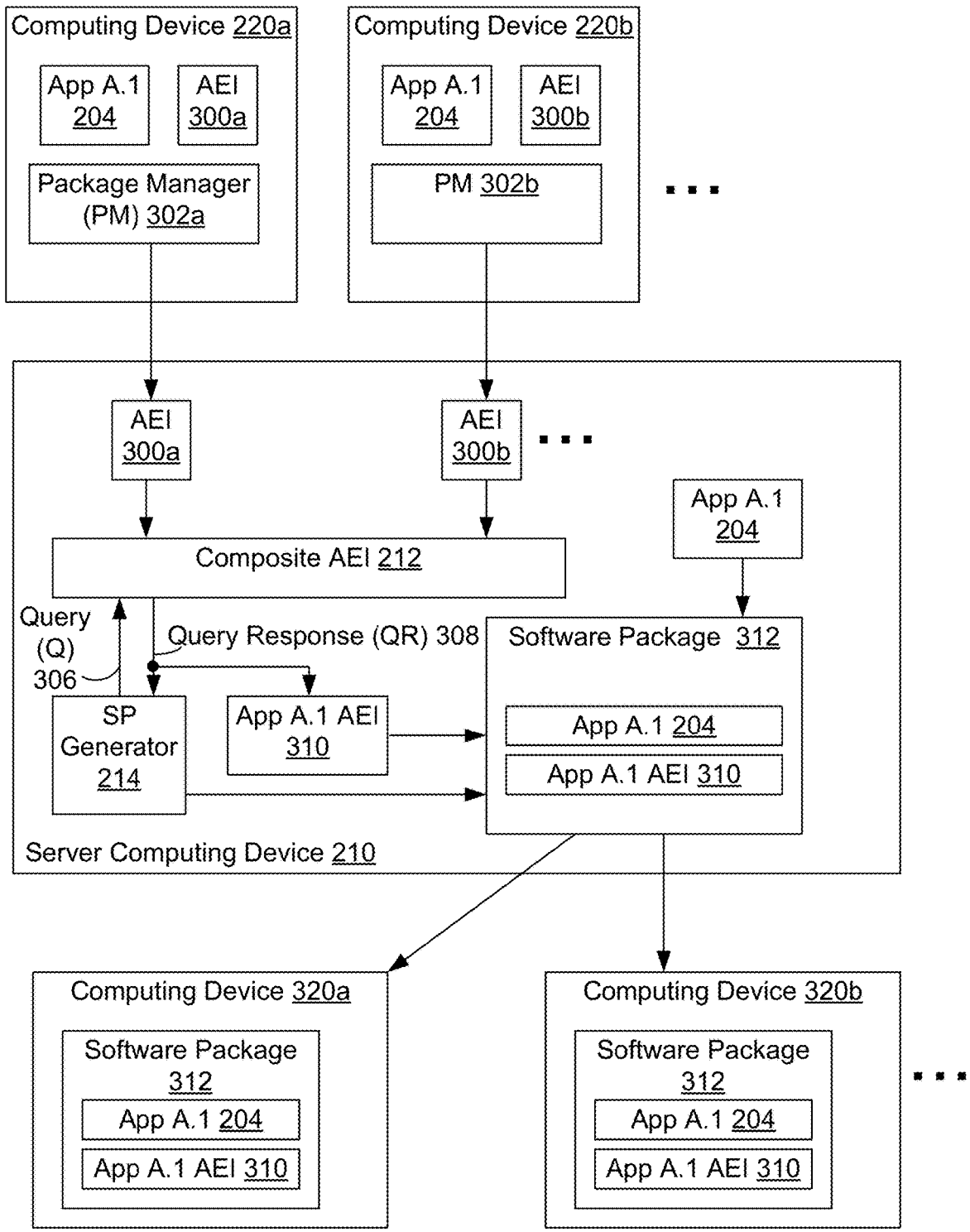

FIG. 3 depicts server computing device 210 generating and distributing software package 312 during scenario 100, in accordance with an example embodiment. In scenario 100, AEI is saved by computing devices 220a and 220b as respective files of AEI 300a and 300b. AEI 300a and 300b are generated after each of respective computing devices 220a and 220b have executed App A.1 204 at least once. For example, AEIs 300a and 300b can include and provide compiler hints, such as listing hot methods and/or classes of App A.1 204 and/or methods and/or classes that are initialize a class of App A.1 204. The listed hot and initialization methods/classes can be methods/classes be predicted to be executed and/or used during execution (i.e., are likely to be executed and/or used during execution) by the software application.

Server computing device 210 requests that each of computing devices 220a and 220b to provide AEI for App A.1 204. In scenario 100, each of computing devices 220a and 220b authorizes the transmission of AEI related to App A.1 204 to server computing device 210. To transmit AEI to server computing device 210, package managers (PMs) 302a and 302b of respective computing devices 220a and 220b communicate respective files of AEI 300a and 300b to server computing device 210.

Upon reception of AEI 300a and 300b, server computing device 210 can aggregate AEI 300a and 300b into composite AEI 212 so that composite AEI 212 includes AEI for App A.1 204. Aggregation of AEI into composite AEI 212 is discussed in more detail in the context of FIG. 5.

After AEI 300a and 300b have been aggregated into composite AEI 212, scenario 100 continues with software package generator 214 determining that server computing device 210 is to generate a new software package that includes App A.1 204. The determination to generate a new software package can be made based on a period of time (e.g., a new software package can be generated daily, weekly, monthly, every three days, etc.), upon reception of new software for the software application (e.g., software for a new application or software a new version of an already-resident application), upon reception of new AEI for the software application, upon a combination of these criteria (e.g., generate a new software package every four days if new AEI is received during the four-day period), and/or upon different criteria; e.g., software package generator 214 can generate a software package upon reception of a request for a new software package from a computing device external to server computing device 210.

After determining to generate a new software package, software package generator 214 can generate and send query (Q) 306 to composite AEI 212 to provide AEI for App A.1 204. Query 306 can include fingerprint information identifying App A, version 1. In response to query 306, composite AEI 212 can retrieve stored AEI for App A, version 1 and generate query response 308 that provides the retrieved AEI as App A.1 AEI 310. In other scenarios, software package generator 214 can generate App A.1 AEI 310 from AEI provided as part of query response 308. In scenario 100, composite AEI 212 and App A.1 AEI 310 include AEI generated by computing devices 220a and 220b; e.g., AEI 300a and 300b. Software package generator 214 then can generate software package 312, where software package 312 includes copies of App A.1 204 and App A.1 AEI 310.

Scenario 100 continues with each of computing devices 320a and 320b requesting respective copies of software application App A from server computing device 210. Upon reception of the requests for software application App A, server computing device 210 can transmit copies of software package 312 to respective computing devices 320a and 320b. Then, each of computing devices 320a and 320b can use installation software to obtain App A.1 AEI 310 and install App A.1 204 from software package 312. As such, installation software and/or runtime systems of computing devices 320a and 320b can take advantage of App A.1 AEI 310 to enhance performance while computing devices 320a and 320b respectively install, verify, and execute App A.1 without waiting for the respective runtime systems to generate AEI. That is, by using App A.1 AEI 310 before installation, much less execution of App A.1 204, computing devices 320a and 320b can take advantage of AEI generated by other computing devices; i.e. computing devices 220a and 220b, to initialize use of App A.1 204 without waiting for AEI to be generated by directly executing App A.1 204. Subsequently, each of computing devices 320a and 320b can update App A.1 AEI 310 during their respective executions of App A.1.

FIG. 4 illustrates composite AEI 212 for scenario 100, in accordance with an example embodiment. Composite AEI 212 can stored by server computing device 210 as a database or similar data entity configured at least to store records 450, 452, 454, 456, 458, 460, 462, 464 of application execution information, where each of records 450-464 includes both fingerprint information 410 and stored AEI 420 for one or more software applications. In other scenarios, composite AEI 212 can include more, fewer, and/or different records of application execution information, fingerprint information, and/or stored AEI.

Fingerprint information 410 can identify a particular software application. As shown in FIG. 4, fingerprint information 410 can include application identifier "App Name" 412 that can include an identifier (e.g., a name or reference number) of the particular software application, an application version identifier "App Version" 414 that can identify a particular version of the of the particular software application, an operating system version identifier "App OS Version" 416 that can identify a specific version of an operating system used to execute the application.

Stored AEI 420 can provide information that can be used to verify, compile, execute, and/or otherwise utilize a software application. As shown in FIG. 4, Stored AEI 420 can include information about a type of stored AEI "AEI Type", 422 method name "Method Name", 424 memory information "Memory Info" 426, power information "Power Info" 428, virtualization information "Virt. Info" 430, class hierarchy information "Hierarchy Info" 432, computing environment information "Env Info" 434, and API information "API Info" 436.

For example, record 450 has fingerprint information 410 of application identifier 412 of "App1", application version 414 of "V1", and operating system version identifier 416 of "1.1.1" indicating that record 450 includes stored AEI for a software application whose fingerprint information indicates the software application is version V1 of App1 and can be executed under operating system version 1.1.1. Record 450 also has stored AEI 420 including a type of stored AEI 422 of "Initial method" and method name 424 of "A.Ainit". Taking fingerprint information 410 and stored AEI 420 in combination for record 450, FIG. 4 shows that record 450 stores AEI listing an initially executed method named "A.Ainit" (that is, that an "Ainit" method of class "A") for version V1 of software application App1 executed under operating system version 1.1.1.

FIG. 4 also shows that composite AEI 212 includes:
record 452 that stores AEI listing a "Hot method" named "B.M_B2" for version V1 of software application App1 executed under operating system version 1.1.1;
record 454 that stores AEI indicating an amount of memory "1.664 MB" (megabytes) is used while executing for version V2 of software application App1 under operating system version 1.3.2;

record 456 that stores AEI indicating an amount of power "0.33 Wh" (watt-hours) is used while executing for version "6.1" of software application "App2" under operating system version "2.0.0";

record 458 that stores AEI with virtualization information indicating that a method "B.M_B2" of version "V1" of software application "App1" executed is executed under operating system version "1.1.2" is "Devirt" or devirtualizable; that is, record 458 indicates that method M_B2 of class B can be optimized during compilation using devirtualization techniques that enable replacement of relatively-slow virtual method calls with relatively-fast direct method calls;

record 460 that stores AEI with hierarchy information of "A-→Ainit; M_A1; M_A2" that indicates class "A" includes three methods named "Ainit", "M_A1", and "M_A2";

record 462 that stores AEI listing a "Hot method" named "B.M_B2" by version "V1" of software application "App1" executed under operating system version "1.1.1"; and record 464 that stores AEI listing an "API" named "MenuA" is used by a class "Class A" by version "V1" of software application "App1" executed under operating system version "1.1.1".

In other scenarios, composite AEI 212 can store more, less, and/or different fingerprint information 410 and/or stored AEI 420. Examples of additional AEI that can be stored by composite AEI 212 include, but are not limited to:

additional operating system information; e.g., a name or other identifier of an operating system;

information related to dependencies between operating system versions and APIs, e.g., API1 is used under versions 1 and 2 of an operating system but is replaced by API2 in versions 3 and later;

information about how frequently a particular method (or other software entity, such as a function, procedure, routine, or subroutine) is invoked from a particular calling location of the software application;

information about one or more method (or other software entity) calls, such as, but not limited to: parameters passed in during a method (or other software entity) call, including constant-valued parameters, references, etc.; and return values of a method (or other software entity);

information about how frequently a particular branch of a conditional statement (such as an IF-THEN statement or switch statement) of a software application is followed;

information about one or more targets of a particular branch of a control statement of a software application is followed;

information about one or more program variables in a software application, including but not limited to, a number of accesses of the one or more program variables, an order of accesses of the one or more program variables, and information about memory alignment of the one or more program variables;

information about a number of iterations of a repetitive software structure (such as a loop, iterator, or recurring function) are performed by a software application;

information about values of control variables of a repetitive software structure of a software application;

information about how long memory for a particular data item has been allocated or "lives"; e.g., hints to a generational garbage collector about which generation to use in allocating memory for the particular data item;

information about where deoptimization was and/or was not used;

information about which lines of a function were executed; e.g., hints for bug detection, optimization, code coverage, and defect rates; and information about a computing environment where a software application is (expected to be) executed; e.g., a desktop computing device, a smartphone, a wearable computing device such as a smart watch, in a vehicle.

As indicated above, AEI can include compiler hints and additional AEI can add additional compiler hints. Along with the example AEI and additional AEI listed above, further AEI can include additional compiler hints. Such compiler hints can include information related to memory and/or register allocation; e.g., information recording which variables are stored in registers, indicate maximum numbers of registers used, free register data, allocation amounts for variable-sized data items, etc. Additional compiler hints also indicate whether a method should be optimized during compilation and/or which compiler optimization techniques should be applied during optimizing compilation of a method or methods. Many other examples of AEI/compiler hints that can be stored by composite AEI 212 are possible as well.

In some embodiments, composite AEI 212 can include static profiling information for one or more software applications, including the particular software application. The static profiling information can be obtained by using one or more profiling heuristics. The profiling heuristic(s) can take software of a software application, such as the particular software application, as an input and generate the static profiling information for the software application as an output. Examples of the static profiling information for a software application include, but are not limited to, information about data flows of the software application such as provided by data flow heuristics, information about semantics of the software application such as provided by abstract interpretation heuristics, and information about variable values of the software application such as provided by symbolic analysis heuristics. Once the static profiling information is generated for the software application, the static profiling information can be aggregated into composite AEI 212 for the software application. In particular of these embodiments, the static profiling information can be obtained without execution of the software application.

Figure 5:
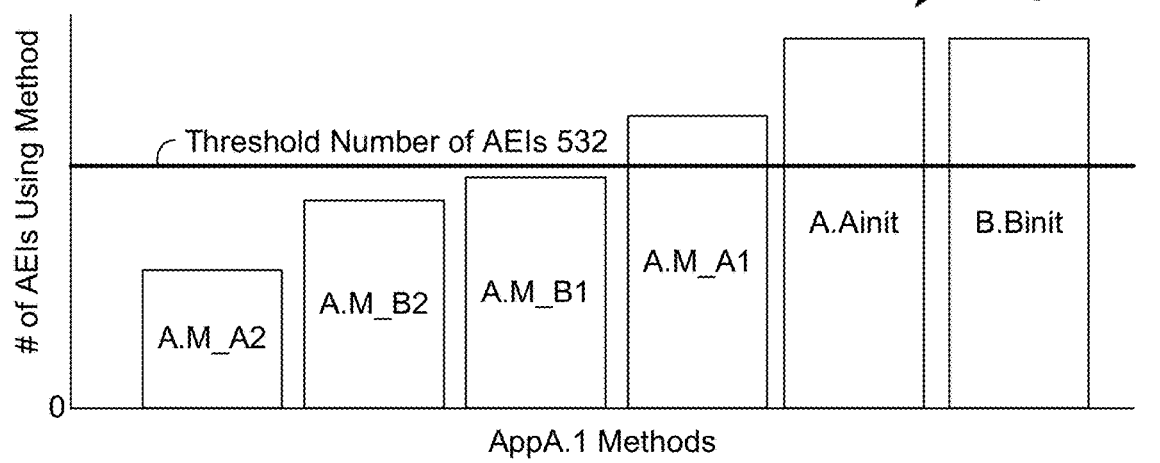
FIG. 5 illustrates combinations of AEI obtained from multiple sources for the scenario of FIG. 1, in accordance with an example embodiment.

FIG. 5 illustrates combinations of AEI obtained from multiple sources in scenario 100, in accordance with an example embodiment. Generally speaking, a combination of AEI can be obtained using one or more combination functions. Examples of these combination functions include, but are not limited to: a combination function that includes taking a union of AEI and/or AEI files, a combination function that includes taking an intersection of AEI and/or AEI files, a combination function that includes taking a sum of data in AEI and/or AEI files, a combination function that includes taking an average of data in AEI and/or AEI files, and a combination function that includes use of counts of data in AEI and/or AEI files.

In particular, FIG. 5 shows AEI 300a obtained from computing device 220a during execution of application App A.1 204 and AEI 300b obtained from computing device 220b during execution of application App A.1 204. AEI 300a and 300b can be combined by taking a union of AEI files, such as AEI 300a and 300b, an intersection of AEI, and/or by other techniques for combining two or more AEI files.

For example, union AEI 510 can be generated by server computing device 210 by taking a union of AEI 300a and AEI 300b. That is, union AEI 510 can include a copy of each line of information that is in either AEI 300a or AEI 300b. For example, AEI 300a has a "HotMethodList" with two methods: "A.M_A1" and "B.M_B1", while AEI 300b also has a "HotMethodList" with two methods: "A.M_A1" and "B.M_B2"; that is, both AEIs 300a and 300b have a hot method list, but the lists differ between AEI 300a and AEI 300b. FIG. 5 shows that union AEI 510 has a "HotMethodList" with three methods: "A.M_A1" (from both AEI 300a and AEI 300b), "B.M_B1" (from AEI 300a), and "B.M_B2" (from AEI 300b).

As another example, intersection AEI 520 can be generated by server computing device 210 by taking an intersection of AEI 300a and AEI 300b. That is, intersection AEI 520 can include a copy of each line of information that is both AEI 300a and AEI 300b. FIG. 5 shows that intersection AEI 520 has a "HotMethodList" with one method: "A.M_A1" that is listed by both AEI 300a and AEI 300b.

Statistically-based techniques can be used to generate AEI. For example, histogram 530 shows an example number of AEIs that use various methods of software application App A.1. These methods include six methods: "A.M_A2", "A.M_B2", "A.M_B1","A.M_A1","A.Ainit", and "B.Binit". Server computing device 210 can keep track of a number of instances that each method appears in received AEI and use those numbers of instances to generate histogram 530.

Histogram 530 also shows threshold number of AEIs 532 drawn as a relatively-thick line in FIG. 5. Threshold number of AEIs 532 can be used to determine which methods listed in histogram 530. For the example shown in FIG. 5, an AEI can be generated by server computing device 210 that includes each method in histogram 530 that has at least threshold number of AEIs 532 would list methods "A.M_A1", "A.Ainit", and "B.Binit". In another example, a threshold percentage of AEIs can be used instead of or along with the threshold number of AEIs 532. Other statistically-based and other techniques can be used to generate AEI as well.

AEI can be aggregated into composite AEI 212. That is, once AEI is received from an AEI source, such as a development computing device (e.g., computing device 200) or a non-development computing device (e.g., computing devices 220a and/or 220b), server computing device 210 can aggregate the received AEI into composite AEI 212. For example, the server computing device can add and/or update records of composite AEI 212 based on the received AEI, add and/or update counts of items listed in the received AEI; e.g., counts of listed fingerprint information, methods, classes, hardware, class hierarchies, environments, and/or determine ranges of likely values of items listed in received AEI; e.g., track ranges of memory and/or power usage by an application as indicated in received AEI and/or composite AEI 212. In some embodiments, the counts and ranges of items can be included in composite AEI 212. Other techniques for aggregating received AEI into composite AEI 212 are possible as well.

AEI can be obtained from one or more AEI sources based on an AEI request rate, where the AEI request rate can specify how many computing devices are queried (or requested) by server computing device 210 about providing AEI. For example, an AEI request rate of 1/100 can indicate that one computing device out of 100 possible computing devices, where the possible computing devices can be a plurality of computing devices that have received a software package with a particular software application, a plurality of computing devices that are authorized to provided AEI and/or a plurality of computing devices that have already provided AEI. Once queried, a computing device may only provide AEI to server computing device 210 when the computing device is authorized (e.g., by a user of the computing device) to provide AEI to another computing device, such as server computing device 210.

The AEI request rate can change over a life cycle of a software application. For example, early in the life cycle of the software application, the software application can be executed by a relatively small number N1 of computing devices. As such, the AEI request rate for the software application can be relatively high; e.g., example relatively-high values of the AEI request rate can include, but are not limited to, 1, 0.5, 0.25, and 0.1. As the life cycle of the software application goes on, the software application can be executed by a relatively larger number N2 of computing devices (where N2>N1), and the AEI request rate for the software application can decrease to a relatively-low request rate value; e.g., example relatively-low values of the AEI request rate can include, but are not limited to, 0.1, 0.05, 0.0025, 0.0005, and 0.0001.

Later in the life cycle of a software application, a newer version of the software application can be released, and the AEI request rate for the older version can be relatively-low or even be set to 0, such as when distribution of the older version of the software application has plateaued, when a maximum number of AEIs have been received, and/or after a period of time where received AEI for the older version of the software application does not change composite AEI for the older version. In some scenarios, server computing device 210 can receive information that one or more particular versions of a software application are no longer supported; in those scenarios, server computing device 210 can purge records of composite AEI 212 whose fingerprint information matches the no-longer-supported version(s) of the software application.

The one or more AEI sources and/or server computing device 210 can provide privacy safeguards for AEI. An AEI source can set the previously-mentioned "AllowAEIAccess" parameter of fingerprint information 122 to allow (e.g., AllowAEIAccess=YES) or disable (e.g., AllowAEIAccess=NO) access and communication of AEI. In some examples, an additional parameter "AllowAEICreation" can enable or disable creation of AEI by an AEI source. When AEI creation and access are granted by an AEI source, the AEI source can anonymize AEI by anonymizing identifying information, such as, but not limited to, device identifying information, user identifying information, location information, and network addressing information before communication of AEI to server computing device 210. Server computing device 210 also can anonymize identifying information AEI provided by the one or more AEI sources during generation of composite AEI 212. Examples of anonymization of identifying information include, but are not limited to: removing part or all of the identifying information, replacing a name with a generic name, e.g., replacing a personal name or user name with a generic name such as "anonymous", "default", or "your name here"; replacing a device identifier with a generic identifier such as "devID", "default", or "device ID", replacing a network address with a generic or invalid address such as "default", "0", "10.0.0.0" or other generic IPv4 address, or "999.999.999.999" representing an invalid IPv4 address; and truncation of identifying information; e.g., only providing one character of a device identifier. Other techniques for anonymizing identifying information are possible as well.

Server computing device 210 (or another computing device) can extract AEI from composite AEI 212. In one example technique for extracting AEI, server computing device 210 can query composite AEI 212 using fingerprint information for particular software application. In response, composite AEI 212 can retrieve AEI related to the software application as identified by the fingerprint information of the query and provide the retrieved AEI as part of a query response. As such, specifying fingerprint information for a particular software application, version of the particular software application, and/or specific version of an operating system used to execute the particular software application in the query can lead to extraction of AEI for the particular software application, a particular version of the particular software application, and/or a specific version of an operating system used to execute the particular software application. The retrieved AEI can be placed into a profile or another file; e.g., a file that is part of a software package for the software application. Other techniques for extracting AEI from composite AEI 212 are possible as well.

Figure 6:
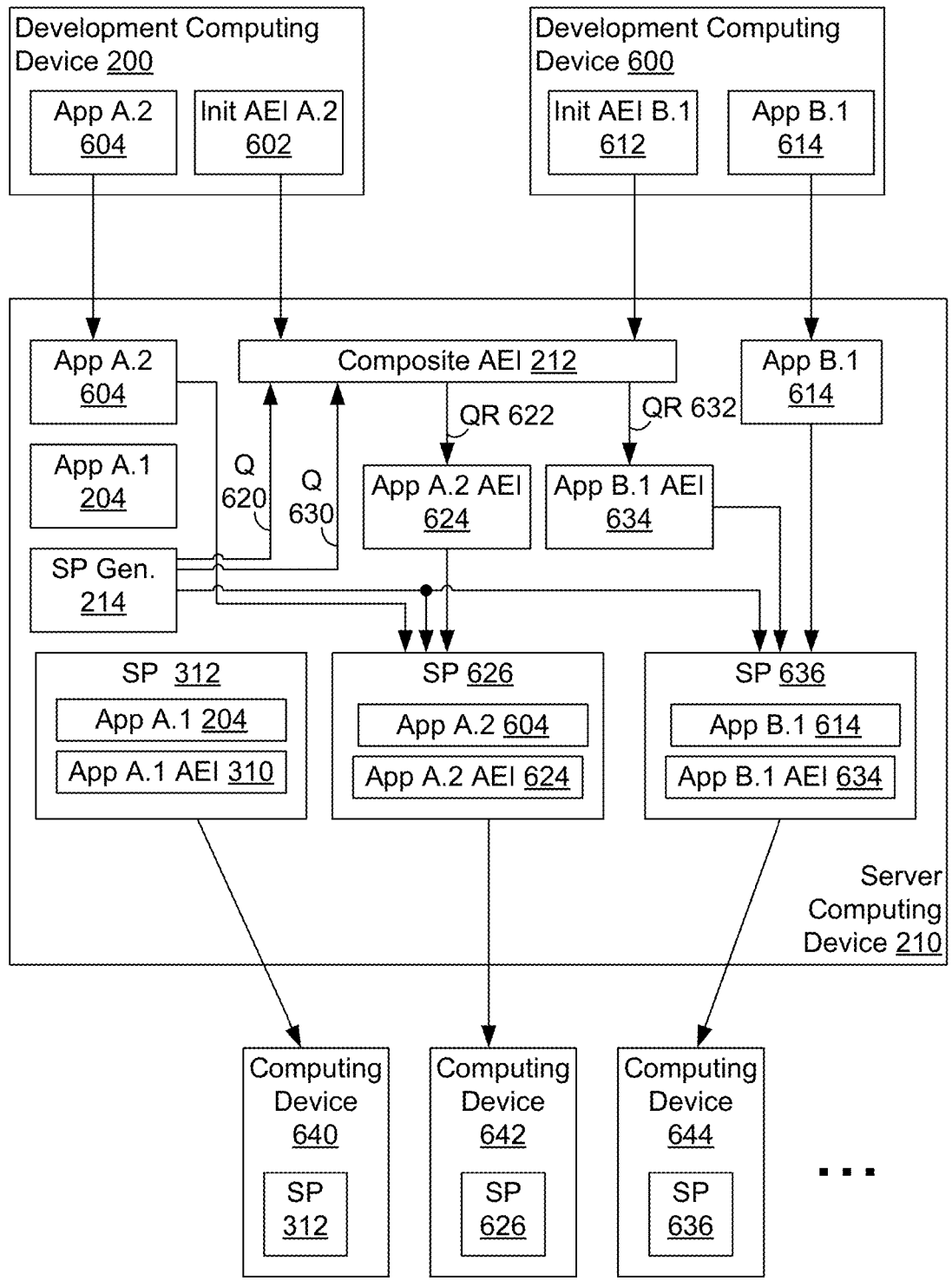
FIG. 6 depicts computing devices generating and distributing additional software packages that include AEI for the scenario of FIG. 1, in accordance with an example embodiment.

FIG. 6 depicts computing devices generating and distributing additional software packages in scenario 100, in accordance with an example embodiment. Scenario 100 continues with development computing device 200 providing a new version of software application App A "A.2" 604 and associated initial AEI for App A.2 604 to server computing device 210. Also, development computing device 600 provides a new software application App B, version 1 or App B.1 614 and associated initial AEI for App B.1 614 to server computing device. Upon reception of App A.2 604, initial AEI for App A.2 602, App B.1 614 and initial AEI for App B.1 612, server computing device can store software applications App A.2 604 and App B.1 614 and can aggregate initial AEI for App A.2 602 and initial AEI for App B.1 612 into composite AEI 212.

Scenario 100 continues with software package generator 214 determining that server computing device 210 is to generate a new software packages that include App A.2 604 and App B.1 614. Determining to generate a new software package is discussed in more detail above in the context of FIG. 3. After determining to generate new software packages for App A.2 604 and App B.1 614 software package generator 214 can generate and send respective queries 620 and 630 to composite AEI 212 to provide respective AEI for App A.2 604 and App B.1 614. In response to query 620, composite AEI 212 can retrieve stored AEI for App A, version 2 and generate query response 622 that provides the retrieved AEI as App A.2 AEI 624. In response to query 630, composite AEI 212 can retrieve stored AEI for App B, version 1 and generate query response 632 that provides the retrieved AEI as App B.1 AEI 634. In other scenarios, software package generator 214 can generate App A.2 AEI 624 and/or App B.1 AEI 634 from AEI provided as part of query response 308.

In scenario 100, composite AEI 212 and App A.2 AEI 624 include AEI generated by computing device 200; e.g., AEI 602. Also, composite AEI 212 and App B.1 AEI 634 include AEI generated by computing device 600; e.g., AEI 612. Software package generator 214 then can generate software packages 626 and 636, where software package 626 includes copies of App A.2 604 and App A.2 AEI 624, and where software package 636 includes copies of App B.1 614 and App B.1 AEI 634. As such, server computing device 210 and composite AEI 212 can store information, including AEI and software packages containing AEI, for multiple versions of multiple software applications, where the AEI can come from a plurality of computing devices, including development computing devices such as computing devices 200 and 600 and non-development computing devices that execute software application, such as computing devices 220a and 220b.

Scenario 100 continues with computing device 640 requesting software application App A, version 1, computing device 642 requesting software application App A, version 2, and computing device 644 requesting software application App B, version 1. Upon reception of the request for software application App A, version 1, server computing device 210 can transmit a copy of software package 312 (that includes App A.1 204 and App A.1 AEI 310) to computing device 640. Then, computing device 640 can use installation software to obtain App A.1 204 and App A.1 AEI 310 from software package 312.

Upon reception of the request for software application App A, version 2, server computing device 210 can transmit a copy of software package 626 (that includes App A.2 604 and App A.2 AEI 624) to computing device 642. Then, computing device 642 can use installation software to obtain App A.2 604 and App A.2 AEI 624 from software package 626. And, upon reception of the request for software application App B, version 1, server computing device 210 can transmit a copy of software package 636 (that includes App B.1 614 and App B.1 AEI 634) to computing device 644. Then, computing device 644 can use installation software to obtain App B.1 614 and App B.1 AEI 634 from software package 636.

As such, installation software and/or runtime systems of computing devices 640, 642, and 644 can take advantage of respective App A.1 AEI 310, App A.2 AEI 624, and App B.1 AEI 634 to enhance performance while computing devices 640, 642, and 644 respectively install, verify, and execute respective software applications App A.1, App A.2, and App B.1 without waiting for the respective runtime systems to generate AEI. That is, by using AEI before installation, much less execution of software applications, computing devices 640, 642, and 644 can take advantage of AEI generated by other computing devices; i.e. computing devices 200, 220a, 220b, and 600 to initialize use of software applications without waiting for AEI to be generated by directly executing those software applications. Subsequently, each of computing devices 640, 642, 644 can update respective copies of App A.1 AEI 310, App A.2 AEI 624, and App B.1 AEI 634 during their respective executions of App A.1, App A.2, and App B.1.

Figure 7A:
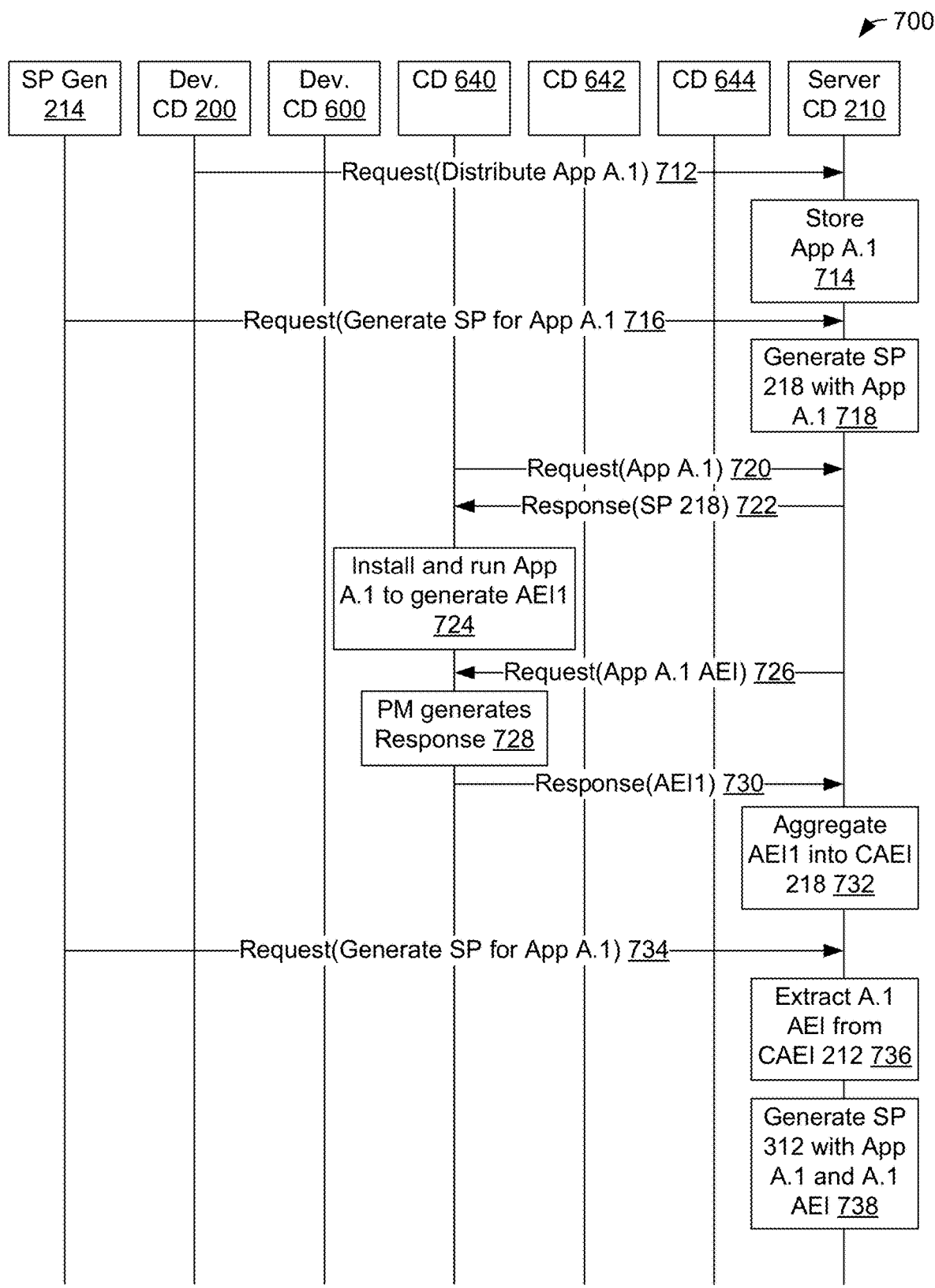
FIGS. 7A-7C show a communication flow for another scenario, in accordance with an example embodiment.
Figure 7B:
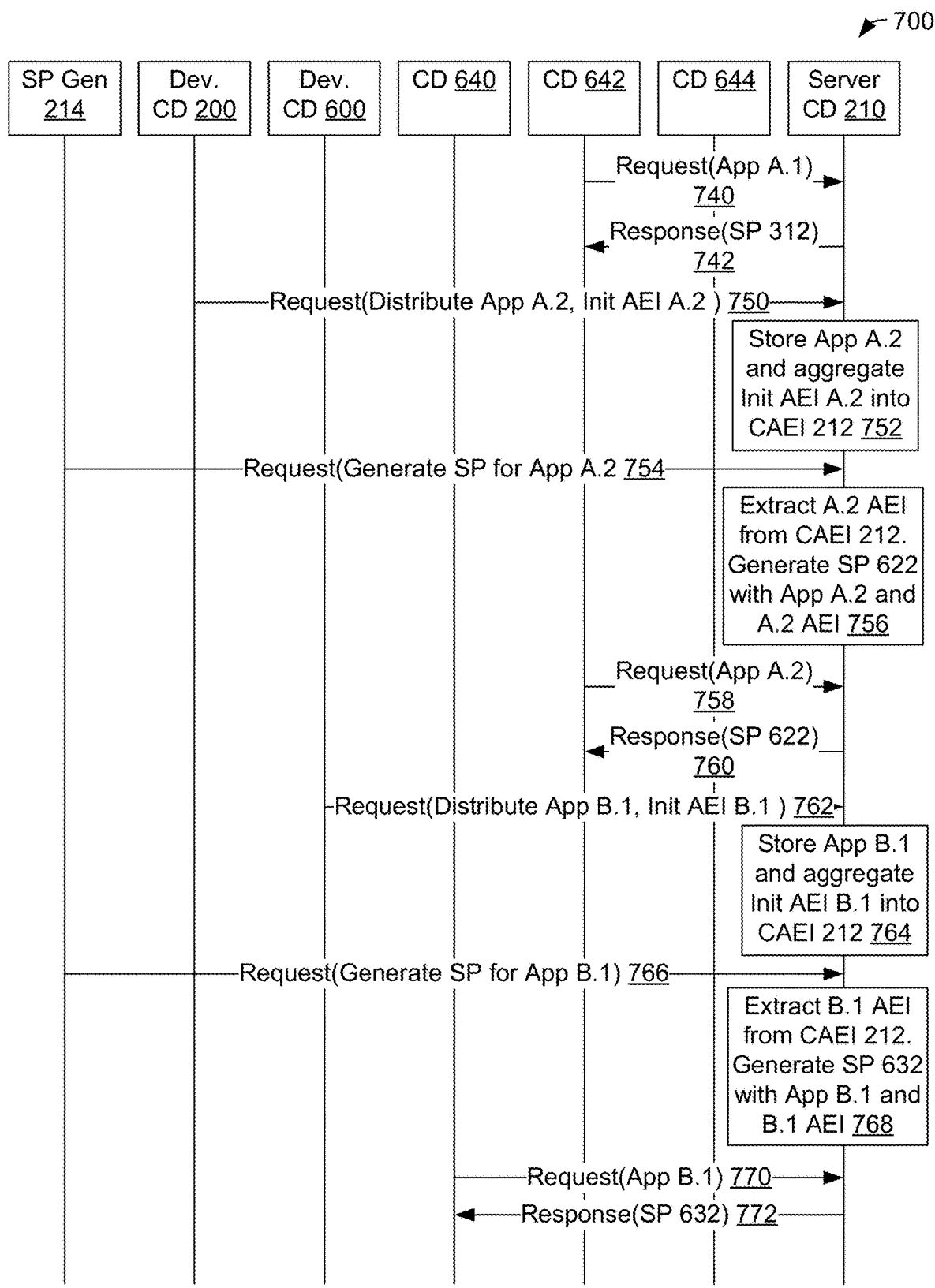
Figure 7C:
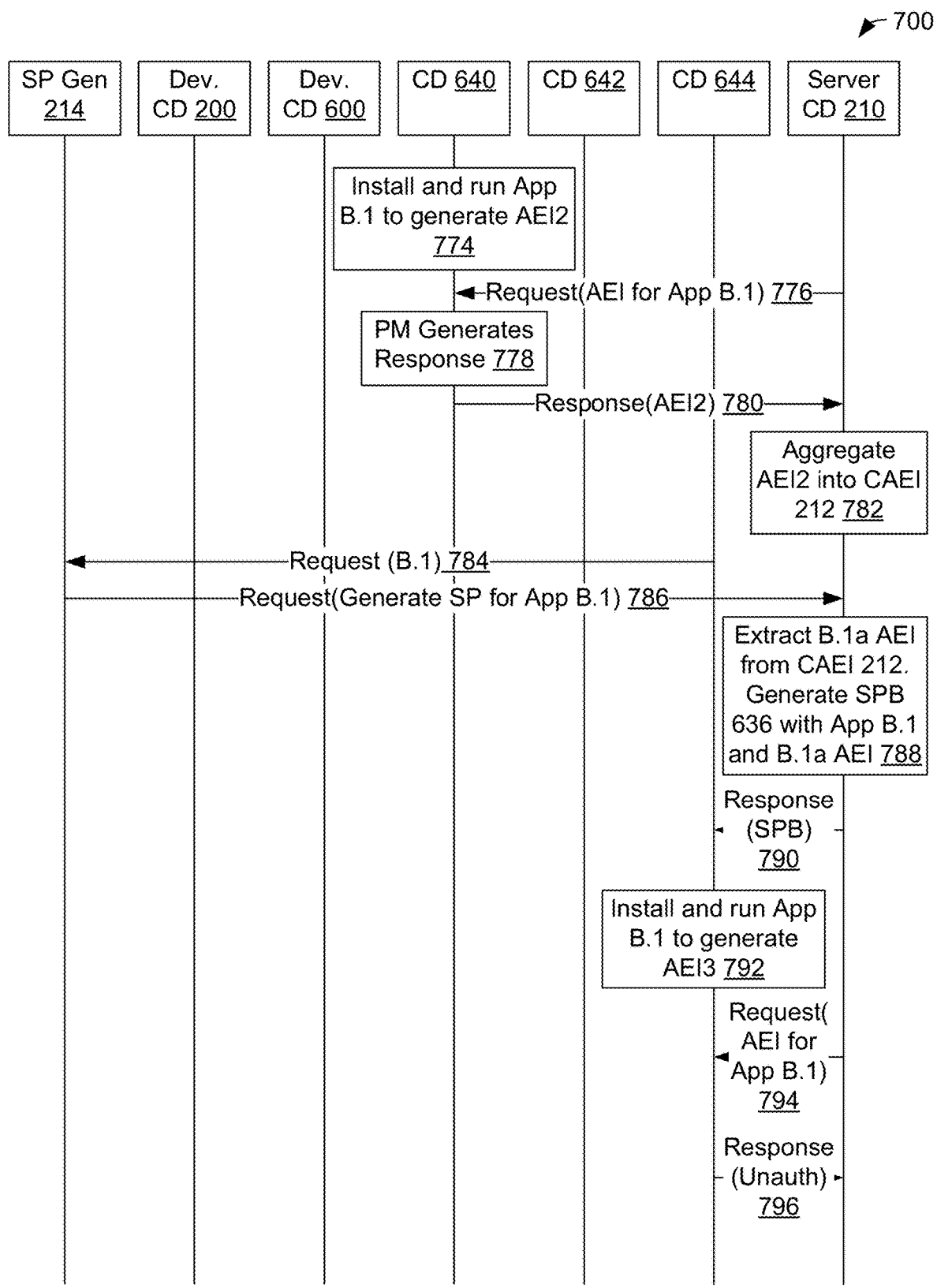

FIGS. 7A-7C show a communication flow diagram for scenario 700, in accordance with an example embodiment. Scenario 700 involves distribution of software packages for three versions of two software applications: App A, version 1, App A, version 2, and App B, version 1. Some of the software packages include AEI to enhance installation, verification, and initial execution of the corresponding software applications.

FIG. 7A shows that scenario 700 begins with development computing device 200 generating request message 712 with a copy of a new software application "App A.1". Development computing device 200 then sends request message 712 to server computing device 210 requesting distribution of new software application "App A.1" to other computing devices. In response to request message 712, server computing device 210 stores App A.1 at block 714 for later distribution. Then, software package generator 214 generates and sends request message 716 to request that server computing device 210 generate a software package that includes App A.1. At block 718, server computing device 210 generates software package 218 that includes a copy of software application App A.1.

Later, computing device 640 generates and sends request message 720 to server computing device 210 requesting a copy of software application App A.1. Server computing device 210 responds to request message 720 by generating response message 722 that contains a copy of software package 218, which in turn includes a copy of App A.1. Server computing device 210 then sends response message 722 to computing device 640. Upon reception of response message 722, computing device 640 verifies and installs App A.1 from software package 218. After App A.1 is installed, computing device 640 executes App A.1 to generate AEI1 that includes AEI generated by execution of App A.1 as indicated by block 724 of FIG. 7A.

Scenario 700 continues with server computing device 210 generating and sending request message 726 to computing device 640 asking for AEI for software application App A.1. In some embodiments, server computing device 210 can determine whether computing device 640 has explicitly authorized transmission of AEI for at least software application App A.1, and server computing device 210 can send request message 726 to computing device 640 only if server computing device 210 determines that computing device 640 has explicitly authorized transmission of AEI of at least software application App A.1. For example, instead of sending request message 726 requesting AEI for App B.1, server computing device 210 can send an inquiry to computing device 640 requesting information about explicit authorized transmission of AEI, and send request message 726 only if information provided in a response to the inquiry indicates that computing device 640 has explicitly authorized transmission of AEI. This information about explicitly authorized transmission can then be saved by server computing device 210 to reduce message traffic related to inquiries about AEI transmission and/or requests for AEI transmission. In still other embodiments, computing device 640 can inform server computing device 210 when AEI authorization information has changed; e.g., computing device 640 changes from allowing AEI transmission for one or more software applications to inhibiting AEI transmission for one or more software applications or vice versa.

In scenario 700, computing device 640 is authorized to transmit AEI to server computing device 210. At block 728, package manager software of computing device 640 determines that computing device 640 is authorized to transmit AEI to server computing device 210, obtains AEI1, and generates response message 730 that includes AEI1. Computing device 640 then sends response message 730 with AEI1 to server computing device 210. At block 732, server computing device 210 can determine whether to update/aggregate composite AEI 212 using AEI1. In scenario 700, server computing device 210 determines to aggregate AEI1 into composite AEI 212, such as discussed above in the context of FIG. 5.

Then, software package generator 214 generates and sends request message 734 to request that server computing device 210 generate a software package that includes App A.1. In response to request message 734, server computing device 210 extracts for software application App A.1 "A.1 AEI" from composite AEI 212 at block 736. Extraction of AEI from composite AEI is discussed above in more detail in the context of FIG. 5. At block 738, server computing device generates software package 312 with copies of software application App A.1 and A.1 AEI. In scenario 700, A.1 AEI includes AEI provided by computing device 640 via response message 730; that is, A.1 AEI has been "crowdsourced" from at least computing device 640.

Turning to FIG. 7B, scenario 700 continues with computing device 642 generating and sending request message 740 to server computing device 210 requesting a copy of software application App A.1. Server computing device 210 responds to request message 740 by generating response message 742, which contains copy of software package 312, which in turn includes copies of software application App A.1 and A.1 AEI. Server computing device 210 then sends response message 742 to computing device 642. Upon reception of response message 742, computing device 642 obtains A.1 AEI from software package 312, and uses A.1 AEI to enhance verification, installation, and execution of software application App A.1. That is, providing A.1 AEI before computing device 642 first executes App A.1 can be used to enhance verification, installation, and execution of version A.1 of software application App A without computing device 642 having to wait for runtime generation of AEI. After App A.1 is installed, computing device 642 can execute App A.1 at least to update the A.1 AEI provided in software package 312.

Scenario 700 continues with development computing device 200 generating request message 750 with copies of a new version of software application App A entitled "App A.2" and associated AEI entitled "Init AEI A.2". Development computing device 200 then sends request message 750 to server computing device 210 requesting distribution of App A.2 to other computing devices. In scenario 700, associated AEI Init AEI A.2 was generated by executing App A.2 on development computing device 200. In response to request message 750, server computing device 210 carries out the procedures of block 752 to store App A.1 and to aggregate Init AEI A.2 into composite AEI 212 for later distribution.

After Init AEI A.2 is aggregated into composite AEI 212, software package generator 214 generates and sends request message 754 to request that server computing device 210 generate a software package that includes App A.2. In response to request message 754, server computing device 210 carries out the procedures of block 756 to extract AEI for software application App A.2 "A.2 AEI" from composite AEI 212 and to generate software package 626 with copies of software application App A.2 and A.2 AEI.

Subsequently, computing device 642 generates and sends request message 758 to server computing device 210 requesting a copy of software application App A.2. In response, server computing device 210 generates response message 760 which contains a copy of software package 626, which in turn includes copies of software application App A.2 and A.2 AEI. Server computing device 210 then sends response message 760 to computing device 642. Upon reception of response message 760, computing device 642 obtains A.2 AEI from software package 626, and uses A.2 AEI to enhance verification, installation, and execution of software App A.2. After App A.2 is installed, computing device 642 can execute software application App A.2 at least to update the A.2 AEI provided in software package 626. That is, providing A.2 AEI before computing device 642 first executes App A.2 can be used to enhance verification, installation, and execution of version A.2 of software application App A without computing device 642 having to wait for runtime generation of AEI.

Scenario 700 continues with development computing device 600 generating request message 762 with copies of a new software application "App B.1" and associated AEI entitled "Init AEI B.1". Development computing device 600 then sends request message 762 to server computing device 210 requesting distribution of App B.1 to other computing devices. In scenario 700, the AEI in Init AEI B.1 was generated by executing App B.1 on development computing device 600 and other computing devices used to test App B.1. In response to request message 762, server computing device 210 carries out the procedures of block 764 to store App B.1 and to aggregate Init AEI B.1 into composite AEI 212 for later distribution.

After Init AEI B.1 is aggregated into composite AEI 212, software package generator 214 generates and sends request message 766 to request that server computing device 210 generate a software package that includes App B.1. In response to request message 766, server computing device 210 carries out the procedures of block 768 to extract AEI for software application App B.1 "B.1 AEI" from composite AEI 212 and to generate software package 636 with copies of software application App B.1 and B.1 AEI. In scenario 700, B.1 AEI includes AEI provided in request message 762 where the AEI was generated by computing device 600 and other computing devices used to test App B.1; that is, B.1 AEI has been "crowd-sourced" from at least computing device 600 and other computing devices used to test App B.1.

Subsequently, computing device 640 generates and sends request message 770 to server computing device 210 requesting a copy of software application App B.1. In response, server computing device 210 generates response message 772 with a copy of software package 636, which in turn includes copies of software application App B.1 and B.1 AEI. Server computing device 210 then sends response message 772 to computing device 640.

Turning to FIG. 7C, upon reception of response message 772, computing device 642 carries out the procedures of block 774 to obtain B.1 AEI from software package 636, and uses B.1 AEI to enhance verification, installation, and execution of App B.1. That is, providing B.1 AEI before computing device 642 first executes App B.1 can be used to enhance verification, installation, and execution of version B.1 of software application App B without computing device 642 having to wait for runtime generation of AEI. Then, after App B.1 is installed, computing device 640 can execute software application App B.1 at least to update the B.1 AEI provided in software package 636.

Scenario 700 continues with server computing device 210 generating and sending request message 776 to computing device 640 to ask for AEI for software application App B.1. In some embodiments, server computing device 210 can determine whether computing device 640 has explicitly authorized transmission of AEI for at least software application App B.1, and server computing device 210 can send request message 776 to computing device 640 only if server computing device 210 determines that computing device 640 has explicitly authorized transmission of AEI of at least software application App B.1, such as discussed above in the context of request message 726.

In scenario 700, computing device 640 is authorized to transmit AEI to server computing device 210. At block 778, package manager software of computing device 640 determines that computing device 640 is authorized to transmit AEI to server computing device 210, obtains AEI2 that includes AEI generated by execution of App B.1, and generates response message 780 that includes AEI2. Computing device 640 then sends response message 780 with AEI2 to server computing device 210. At block 782, server computing device 210 can determine whether to update/aggregate composite AEI 212 using AEI2. In scenario 700, server computing device 210 determines to aggregate AEI2 into composite AEI 212, such as discussed above in the context of FIG. 5. At this stage of scenario 700, composite AEI 212 includes AEI for software applications App A.1, App A.2, and App B.1, where the AEI for these software applications has been generated by a plurality of computing devices; e.g., development computing devices 200 and 600, testing computing devices, and computing device 640.

After Init AEI B.1 is aggregated into composite AEI 212, computing device 644 generates and sends request message 784 to server computing device 210 requesting a copy of software application App B.1. After receiving request message 784 for software application App B.1, software package generator 214 of server computing device 210 generates and sends request message 786 to server computing device 210 request generation of a software package that includes App B.1. In response to request message 786, server computing device 210 carries out the procedures of block 788 to extract AEI for software application App B.1 "B.1a AEI" from composite AEI 212 and to generate software package SPB with copies of software application App B.1 and B.1a AEI.

In scenario 700, B.1a AEI extracted at block 788 differs from B.1 AEI extracted at block 768 as composite AEI 212 has aggregated additional AEI related to software application App B.1; e.g., AEI2, since the procedures of block 768 were executed. As such, server computing device 210 can generate software packages, all of which have the same software but have different versions of AEI. Each subsequent version of AEI can be extracted from composite AEI 212 that reflects information obtained by progressively more computing devices. In some examples, some or all subsequent versions of AEI can further enhance installation, verification, and execution of software in comparison to earlier versions of AEI. Further, software distributed with initial AEI can enhance installation, verification, and execution of software in comparison to software without initial AEI.

In response to request message 784, server computing device 210 generates response message 790 with a copy of software package SPB, which in turn includes copies of software application App B.1a and B.1 AEI. Server computing device 210 then sends response message 790 to computing device 644. Upon reception of response message 790, computing device 644 carries out the procedures of block 792 to obtain B.1a AEI from software package SPB, and uses B.1a AEI to enhance verification, installation, and execution of App B.1. That is, providing B.1a AEI before computing device 644 first executes App B.1 can be used to enhance verification, installation, and execution of version B.1 of software application App B without computing device 644 having to wait for runtime generation of AEI. After App B.1 is installed, computing device 644 can execute software application App B.1 at least to update the B.1 AEI provided in software package SPB and so generate AEI3, which contains AEI related to software application App B.1.

Scenario 700 continues with server computing device 210 generating and sending request message 794 to computing device 644 to ask for AEI for software application App B.1. In scenario 700, computing device 644 is not authorized to transmit AEI to server computing device 210. Then, package manager software of computing device 644 determines that computing device 644 is not authorized to transmit AEI to server computing device 210 and generates response message 796 indicating that the request for AEI is unauthorized Computing device 644 then sends response message 796 to server computing device 210. Scenario 700 can then be completed.

In some embodiments, server computing device 210 can determine whether computing device 644 has explicitly authorized transmission of AEI for at least software application App B.1, and server computing device 210 can send request message 794 to computing device 644 only if server computing device 210 determines that computing device 640 has explicitly authorized transmission of AEI of at least software application App B.1, such as discussed above in at least in the context of request message 726.

Example Data Network

Figure 8:
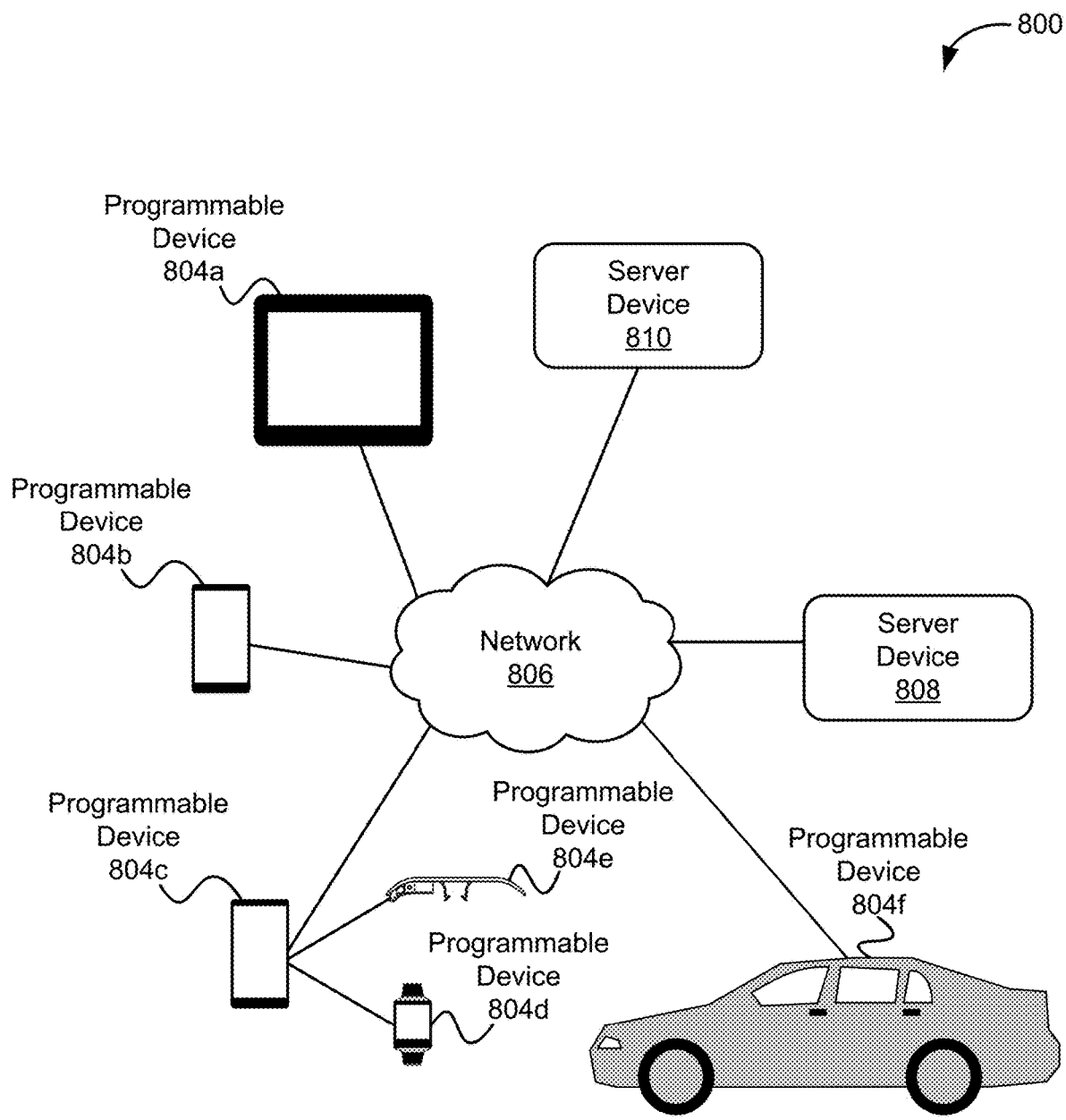
FIG. 8 depicts a distributed computing architecture, in accordance with an example embodiment.

FIG. 8 depicts a distributed computing architecture 800 with server devices 808, 810 configured to communicate, via network 806, with programmable devices 804a, 804b, 804c, 804d, 804e, 804f in accordance with an example embodiment. Network 806 may correspond to a LAN, a wide area network (WAN), a corporate intranet, the public Internet, or any other type of network configured to provide a communications path between networked computing devices. Network 806 may also correspond to a combination of one or more LANs, WANs, corporate intranets, and/or the public Internet.

Although FIG. 8 only shows six programmable devices, distributed application architectures may serve tens, hundreds, or thousands of programmable devices. Moreover, programmable devices 804a, 804b, 804c, 804d, 804e, 804f (or any additional programmable devices) may be any sort of computing device, such as an ordinary laptop computer, desktop computer, wearable computing device, mobile computing device, head-mountable device (HMD), network terminal, wireless communication device (e.g., a smart phone or cell phone), and so on. In some embodiments, such as indicated with programmable devices 804a, 804b, 804c, programmable devices can be directly connected to network 806. In other embodiments, such as indicated with programmable devices 804d and 804e, programmable devices can be indirectly connected to network 806 via an associated computing device, such as programmable device 804c. In this example, programmable device 804c can act as an associated computing device to pass electronic communications between programmable devices 804d and 804e and network 806. In yet other embodiments, such as shown in programmable device 804f, a computing device can be part of and/or inside a vehicle; e.g., a car, a truck, a bus, a boat or ship, an airplane, etc. In still other embodiments not shown in FIG. 8, a programmable device can be both directly and indirectly connected to network 806.

Server devices 808, 810 can be configured to perform one or more services, as requested by programmable devices 804a-804f. For example, server device 808 and/or 810 can provide content to programmable devices 804a-804f. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 808 and/or 810 can provide programmable devices 804a-804f with access to software for database, search, computation, graphical, audio, video, World Wide Web/Internet utilization, and/or other functions. Many other examples of server devices are possible as well.

Computing Device Architecture

Figure 9A:
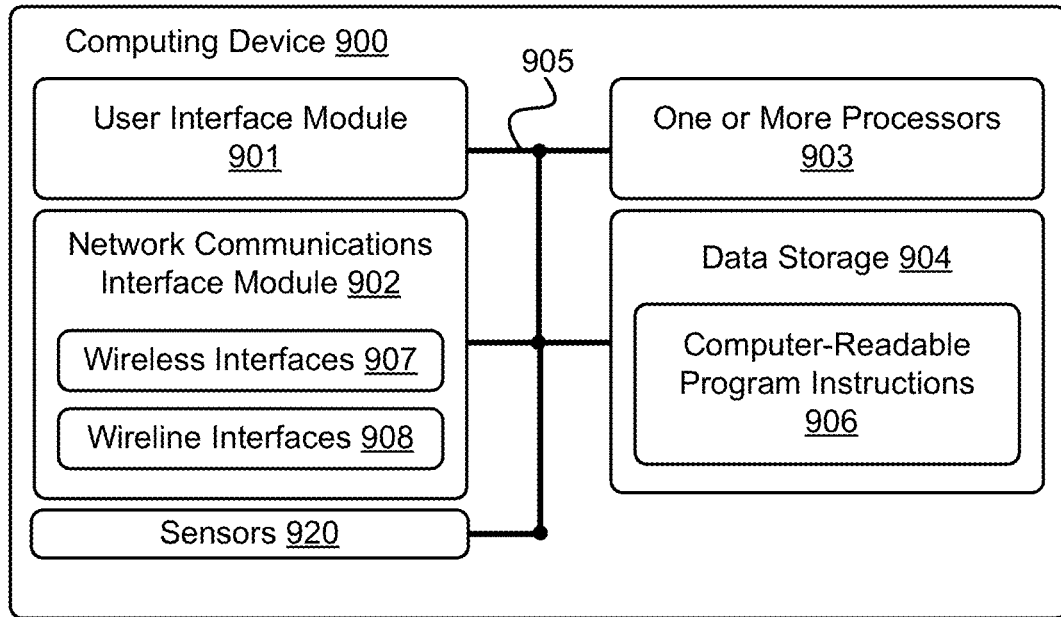
FIG. 9A is a functional block diagram of an example computing device, in accordance with an example embodiment.

FIG. 9A is a functional block diagram of computing device 900, in accordance with an example embodiment. In particular, computing device 900 shown in FIG. 9A can be configured to perform at least one function related to a software application, AEI, composite AEI, a software package, a JIT compiler, a AOT compiler, a runtime system, an application platform, computing devices 102, 220a, 220b, 320a, 320b, 640, 642, 644, development computing devices 200, 600, server computing device 210, software package generator 214, package manager 302a, 302b, programmable devices 804a, 804b, 804c, 804d, 804e, 804f, server devices 808, 810, scenarios 100, 700 and/or method 1000.

Computing device 900 may include a user interface module 901, a network-communication interface module 902, one or more processors 903, data storage 904, and one or more sensors 920, all of which may be linked together via a system bus, network, or other connection mechanism 905.

User interface module 901 can be operable to send data to and/or receive data from external user input/output devices. For example, user interface module 901 can be configured to send and/or receive data to and/or from user input devices such as a keyboard, a keypad, a touch screen, a computer mouse, a track ball, a joystick, a camera, a voice recognition module, and/or other similar devices. User interface module 901 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 901 can also be configured to generate audible output(s), such as a speaker, speaker jack, audio output port, audio output device, earphones, and/or other similar devices.

Network-communications interface module 902 can include one or more wireless interfaces 907 and/or one or more wireline interfaces 908 that are configurable to communicate via a network. Wireless interfaces 907 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 908 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 902 can be configured to provide reliable, secured, and/or authenticated communications. For each communication, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 903 can include one or more general purpose processors, and/or one or more special purpose processors (e.g., digital signal processors, graphics processing units, application specific integrated circuits, etc.). One or more processors 903 can be configured to execute computer-readable program instructions 906 that are contained in data storage 904 and/or other instructions as described herein.

Data storage 904 can include one or more computer-readable storage media that can be read and/or accessed by at least one of one or more processors 903. The one or more computer-readable storage media can include volatile and/or non-volatile storage components, such as optical, magnetic, organic or other memory or disc storage, which can be integrated in whole or in part with at least one of one or more processors 903. In some embodiments, data storage 904 can be implemented using a single physical device (e.g., one optical, magnetic, organic or other memory or disc storage unit), while in other embodiments, data storage 904 can be implemented using two or more physical devices.

Data storage 904 can include computer-readable program instructions 906 and perhaps additional data. In some embodiments, data storage 904 can additionally include storage required to perform at least part of the herein-described methods, scenarios, and techniques and/or at least part of the functionality of the herein-described devices and networks.

In some embodiments, computing device 900 can include one or more sensors 920. Sensor(s) 920 can be configured to measure conditions in an environment of computing device 900 and provide data about that environment. For example, sensor(s) 920 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of computing device 900, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 900, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 900, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 920 are possible as well.

Cloud-Based Servers

Figure 9B:
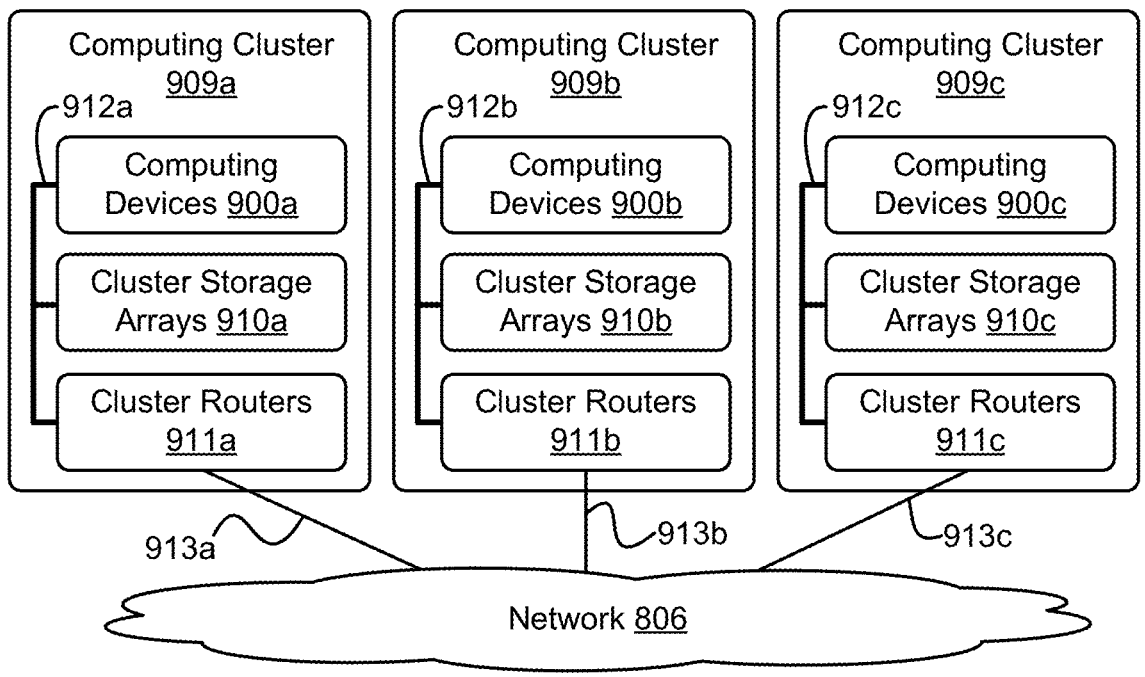
FIG. 9B depicts a network of computing clusters arranged as a cloud-based server system, in accordance with an example embodiment.

FIG. 9B depicts a network 914 of computing clusters 909a, 909b, 909c arranged as a cloud-based server system in accordance with an example embodiment. Computing clusters 909a, 909b, 909c can be cloud-based devices that store program logic and/or data of cloud-based applications and/or services; e.g., perform at least one function of a software application, AEI, composite AEI, a software package, a JIT compiler, a AOT compiler, a runtime system, an application platform, computing devices 102, 220a, 220b, 320a, 320b, 640, 642, 644, development computing devices 200, 600, server computing device 210, software package generator 214, package manager 302a, 302b, programmable devices 804a, 804b, 804c, 804d, 804e, 804f, server devices 808, 810, scenarios 100, 700 and/or method 1000.

In some embodiments, computing clusters 909a, 909b, 909c can be a single computing device residing in a single computing center. In other embodiments, computing clusters 909a, 909b, 909c can include multiple computing devices in a single computing center, or even multiple computing devices located in multiple computing centers located in diverse geographic locations. For example, FIG. 9B depicts each of computing clusters 909a, 909b, and 909c residing in different physical locations.

In some embodiments, data and services at computing clusters 909a, 909b, 909c can be encoded as computer readable information stored in non-transitory, tangible computer readable media (or computer readable storage media) and accessible by other computing devices. In some embodiments, computing clusters 909a, 909b, 909c can be stored on a single disk drive or other tangible storage media, or can be implemented on multiple disk drives or other tangible storage media located at one or more diverse geographic locations.

FIG. 9B depicts a cloud-based server system in accordance with an example embodiment. In FIG. 9B, functionality of a software application, AEI, composite AEI, a software package, a JIT compiler, a AOT compiler, a runtime system, an application platform and/or a computing device can be distributed among computing clusters 909a, 909b, 909c. Computing cluster 909a can include one or more computing devices 900a, cluster storage arrays 910a, and cluster routers 911a connected by a local cluster network 912a. Similarly, computing cluster 909b can include one or more computing devices 900b, cluster storage arrays 910b, and cluster routers 911b connected by a local cluster network 912b. Likewise, computing cluster 909c can include one or more computing devices 900c, cluster storage arrays 910c, and cluster routers 911c connected by a local cluster network 912c.

In some embodiments, each of computing clusters 909a, 909b, and 909c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 909a, for example, computing devices 900a can be configured to perform various computing tasks of a software application, AEI, composite AEI, a software package, a JIT compiler, an AOT compiler, a runtime system, an application platform and/or a computing device. In one embodiment, the various functionalities of a software application, AEI, composite AEI, a software package, a JIT compiler, an AOT compiler, a runtime system, an application platform and/or a computing device can be distributed among one or more of computing devices 900a, 900b, 900c. Computing devices 900b and 900c in respective computing clusters 909b and 909c can be configured similarly to computing devices 900a in computing cluster 909a. On the other hand, in some embodiments, computing devices 900a, 900b, and 900c can be configured to perform different functions.

In some embodiments, computing tasks and stored data associated with a software application, AEI, composite AEI, a software package, a JIT compiler, a AOT compiler, a runtime system, an application platform and/or a computing device can be distributed across computing devices 900a, 900b, and 900c based at least in part on the processing requirements of a software application, AEI, composite AEI, a software package, a JIT compiler, a AOT compiler, a runtime system, an application platform and/or a computing device, the processing capabilities of computing devices 900a, 900b, 900c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 910a, 910b, 910c of computing clusters 909a, 909b, 909c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a software application, AEI, composite AEI, a software package, a JIT compiler, a AOT compiler, a runtime system, an application platform and/or a computing device can be distributed across computing devices 900a, 900b, 900c of computing clusters 909a, 909b, 909c, various active portions and/or backup portions of these components can be distributed across cluster storage arrays 910a, 910b, 910c. For example, some cluster storage arrays can be configured to store one portion of the data of a software application, AEI, composite AEI, a software package, a JIT compiler, a AOT compiler, a runtime system, an application platform and/or a computing device, while other cluster storage arrays can store other portion(s) of data of a software application, AEI, composite AEI, a software package, a JIT compiler, a AOT compiler, a runtime system, an application platform and/or a computing device. Additionally, some cluster storage arrays can be configured to store backup versions of data stored in other cluster storage arrays.

Cluster routers 911a, 911b, 911c in computing clusters 909a, 909b, 909c can include networking equipment configured to provide internal and external communications for the computing clusters. For example, cluster routers 911a in computing cluster 909a can include one or more internet switching and routing devices configured to provide (i) local area network communications between computing devices 900a and cluster storage arrays 910a via local cluster network 912a, and (ii) wide area network communications between computing cluster 909a and computing clusters 909b and 909c via wide area network connection 913a to network 806. Cluster routers 911b and 911c can include network equipment similar to cluster routers 911a, and cluster routers 911b and 911c can perform similar networking functions for computing clusters 909b and 909b that cluster routers 911a perform for computing cluster 909a.

In some embodiments, the configuration of cluster routers 911a, 911b, 911c can be based at least in part on the data communication requirements of the computing devices and cluster storage arrays, the data communications capabilities of the network equipment in cluster routers 911a, 911b, 911c, the latency and throughput of local networks 912a, 912b, 912c, the latency, throughput, and cost of wide area network connections 913a, 913b, 913c, and/or other factors that can contribute to the cost, speed, fault-tolerance, resiliency, efficiency and/or other design criteria of the moderation system architecture.

Example Methods of Operation

Figure 10:
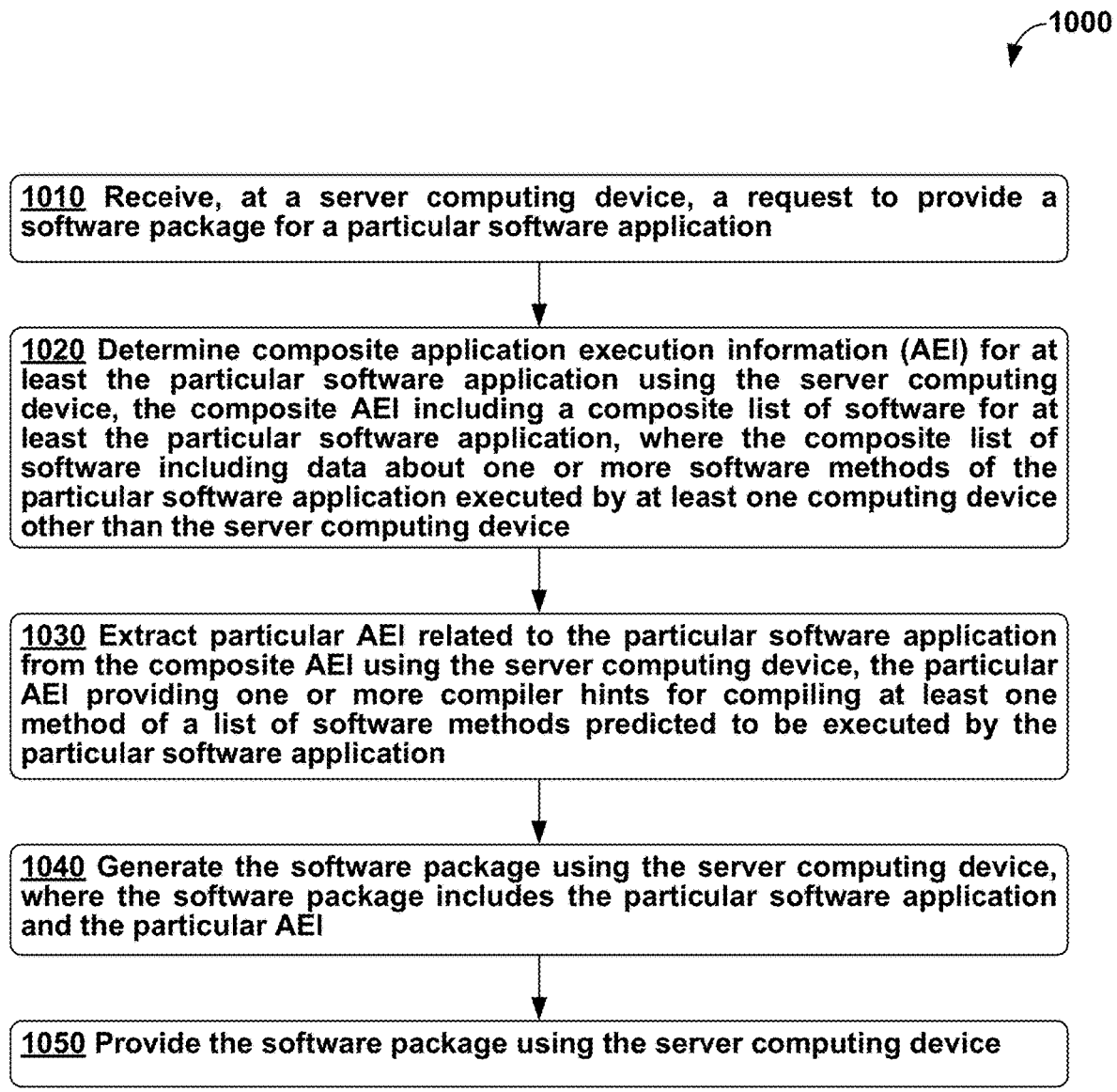
FIG. 10 is a flowchart of a method, in accordance with an example embodiment.

FIG. 10 is a flowchart of method 1000, in accordance with an example embodiment. Method 1000 can be executed by a server computing device, such as computing device 900 acting as a server computing device. Method 1000 can begin at block 1010, where the server computing device can receive a request to provide a software package for a particular software application, such as discussed above at least in the context of FIGS. 2, 3, 6, and 7C.

At block 1020, the server computing device can determine composite AEI for at least the particular software application, such as discussed above at least in the context of FIGS. 3, 6, 7A, 7B, and 7C. The composite AEI can include a composite list of software for at least the particular software application, where the composite list of software can include data about one or more software methods of the particular software application executed by at least one computing device other than the server computing device.

In some embodiments, the composite list of software can include data about one or more software methods executed upon starting the particular software application, such as discussed above at least in the context of FIG. 4. In other embodiments, the composite list of software can further include data about one or more software classes utilized by the particular software application, such as discussed above at least in the context of FIGS. 1 and 3.

In yet other embodiments, the composite AEI can further include information including at least one of: class hierarchy information related to the particular software application, information about memory used during execution of the particular software application, information about power consumed during execution of the particular software application, devirtualization information related to the particular software application, information about hardware of a computing device executing the particular software application; information related to dependencies between operating system versions and application program interfaces (APIs); information about how frequently a particular method is invoked from a particular calling location of the particular software application; information about how frequently a particular branch of a control statement of the particular software application is followed; information about one or more program variables in the particular software application; information about a number of iterations of a repetitive software structure are performed by the particular software application; and information about values of control variables of a repetitive software structure of a software application, such as discussed above at least in the context of FIG. 4.

In still other embodiments, determining the composite AEI for at least the particular software application can include: determining the composite AEI from a plurality of computing devices that have executed the particular software application, such as discussed above at least in the context of FIGS. 5, 6, 7A, 7B, and 7C. In particular of these embodiments, determining the composite AEI from the plurality of computing devices that have executed the particular software application can include: receiving, at the server computing device, first AEI for the particular software application from a first computing device of the plurality of computing devices; receiving, at the server computing device, second AEI for the particular software application from a first computing device of the plurality of computing devices; taking a union of the first AEI and the second AEI using the server computing device; and determining the composite AEI based on the union of the first AEI and second AEI using the server computing device, such as discussed above at least in the context of FIG. 5.

In other particular of these embodiments, determining the composite AEI from the plurality of computing devices that have executed the particular software application can include: receiving, at the server computing device, first AEI for the particular software application from a first computing device of the plurality of computing devices; receiving, at the server computing device, second AEI for the particular software application from a first computing device of the plurality of computing devices; taking an intersection of the first AEI and the second AEI using the server computing device; and determining the composite AEI based on the intersection of the first AEI and second AEI using the server computing device, such as discussed above at least in the context of FIG. 5.

In still other particular of these embodiments, determining the composite AEI from the plurality of computing devices that have executed the particular software application can include: receiving, at the server computing device, first AEI for the particular software application from a first computing device of the plurality of computing devices; receiving, at the server computing device, second AEI for the particular software application from a first computing device of the plurality of computing devices; determining one or more counts of one or more respective software methods in the list of software methods based on the first AEI and the second AEI using the server computing device; and determining the composite AEI based on the one or more counts using the server computing device, such as discussed above at least in the context of FIG. 5.

In even other particular of these embodiments, determining the composite AEI from the plurality of computing devices that have executed the particular software application can include: receiving, at the server computing device, first AEI for the particular software application via a package manager on a first computing device of the plurality of computing devices; determining whether to update the composite AEI using the first AEI using the server computing device; and after determining to update the composite AEI, updating the composite AEI based on the first AEI using the server computing device, such as discussed above at least in the context of FIGS. 7A and 7C.

In yet other particular of these embodiments, determining the composite AEI from the plurality of computing devices that have executed the particular software application can include: determining whether a particular computing device of the plurality of computing devices that has explicitly authorized transmission of AEI for the particular software application; after determining that the particular computing device of the plurality of computing devices that has explicitly authorized transmission of AEI for the particular software application, requesting AEI for the particular software application from the particular computing device; and receiving the requested AEI for the particular software application from the particular computing device, such as discussed in the context of at least FIGS. 7A and 7C.

In even other embodiments, determining the composite AEI can include determining static profiling information for the particular software application using one or more profiling heuristics; and aggregating the static profiling information into the composite AEI, such as discussed in the context of at least FIG. 4.

In further other embodiments, the composite AEI can include information about one or more application program interfaces that are utilized by the particular software application, such as discussed in the context of at least FIG. 5.

At block 1030, the server computing device can extract particular AEI related to the particular software application from the composite AEI, such as discussed above at least in the context of FIGS. 3, 6, 7A, 7B, and 7C. The particular AEI can provide one or more compiler hints for compiling at least one method of a list of software methods predicted to be executed by the particular software application.

In some embodiments, the particular AEI can include fingerprint information for the particular software application, the fingerprint information including: information identifying the particular software application, information identifying a particular version of the particular software application, and information about an operating system used to execute the particular software application, such as discussed above at least in the context of FIGS. 1, 4, 5, and 6.

In other embodiments, the composite AEI can include AEI for a plurality of versions of the particular software application and the composite list of software can include data about one or more software methods for each of the plurality of versions of the particular software application. Then, extracting particular AEI related to the particular software application from the composite AEI includes: extracting selected AEI from at least the composite list of software of the composite AEI based at least on the version information in the fingerprint information; and determining the AEI related to the particular software application based on the selected AEI, such as discussed above at least in the context of FIGS. 4, 5, and 6.

In even other embodiments, the particular software application can be executed by at least a first version of an operating system and a second version of an operating system, where the first version of the operating system does not support a first application program interface utilized by the particular software application, and where the second version of the operating system does support the first application programming interface. Then, extracting particular AEI related to the particular software application from the composite AEI can include: extracting first information for validating the particular software application related to the first version of the operating system from the composite AEI, where the first information for validating the particular software application includes information that the first application program interface is not supported by the first version of the operating system; and extracting second information for validating the particular software application related to the second version of the operating system from the composite AEI, where the second information for validating the particular software application includes information that the first application program interface is supported by the second version of the operating system.

At block 1040, the server computing device can generate the software package, where the software package includes the particular software application and the particular AEI, such as discussed above at least in the context of FIGS. 3, 6, 7A, 7B, and 7C.

At block 1050, the server computing device can provide the software package, such as discussed above at least in the context of FIGS. 3, 6, 7A, 7B, and 7C. In some embodiments, providing the software package can include: receiving a request for the particular software application at the server computing device; and after receiving the request for the particular software application, providing the software package that includes the particular software application and the particular AEI using the server computing device, such as discussed above at least in the context of FIGS. 3, 6, 7A, 7B, and 7C.

Additional Example Embodiments

The following clauses are offered as further description of the disclosure.

Clause 1—A method, including: receiving, at a server computing device, a request to provide a software package for a particular software application; determining composite application execution information (AEI) for at least the particular software application using the server computing device, the composite AEI including a composite list of software for at least the particular software application, where the composite list of software includes data about one or more software methods of the particular software application executed by at least one computing device other than the server computing device; extracting particular AEI related to the particular software application from the composite AEI using the server computing device, the particular AEI providing one or more compiler hints for compiling at least one software method of a list of software methods predicted to be executed by the particular software application; generating the software package using the server computing device, where the software package includes the particular software application and the particular AEI; and providing the software package using the server computing device.

Clause 2—The method of Clause 1, where the particular AEI includes fingerprint information for the particular software application, the fingerprint information including: information identifying the particular software application, information identifying a particular version of the particular software application, and information about an operating system used to execute the particular software application.

Clause 3—The method of Clause 2, where the composite AEI includes AEI for a plurality of versions of the particular software application, where the composite list of software includes data about one or more software methods for each of the plurality of versions of the particular software application, and where extracting particular AEI related to the particular software application from the composite AEI includes: extracting selected AEI from at least the composite list of software of the composite AEI based at least on the version information in the fingerprint information; and determining the AEI related to the particular software application based on the selected AEI.

Clause 4—The method of any one of Clauses 1-3, where the composite list of software includes data about one or more software methods executed upon starting the particular software application.

Clause 5—The method of any one of Clauses 1-4, where the composite list of software further includes data about one or more software classes utilized by the particular software application.

Clause 6—The method of any one of Clauses 1-5, where the composite AEI further includes information including at least one of: class hierarchy information related to the particular software application, information about memory used during execution of the particular software application, information about power consumed during execution of the particular software application, devirtualization information related to the particular software application, information about hardware of a computing device executing the particular software application; information related to dependencies between operating system versions and application program interfaces (APIs); information about how frequently a particular method is invoked from a particular calling location of the particular software application; information about how frequently a particular branch of a control statement of the particular software application is followed; information about one or more program variables in the particular software application information about a number of iterations of a repetitive software structure are performed by the particular software application; and information about values of control variables of a repetitive software structure of a software application.

Clause 7—The method of any one of Clauses 1-6, where determining the composite AEI for at least the particular software application includes determining the composite AEI from a plurality of computing devices that have executed the particular software application.

Clause 8—The method of Clause 7, where determining the composite AEI from the plurality of computing devices that have executed the particular software application includes: receiving, at the server computing device, first AEI for the particular software application from a first computing device of the plurality of computing devices; receiving, at the server computing device, second AEI for the particular software application from a first computing device of the plurality of computing devices; taking a union of the first AEI and the second AEI using the server computing device; and determining the composite AEI based on the union of the first AEI and second AEI using the server computing device.

Clause 9—The method of either Clause 7 or Clause 8, where determining the composite AEI from the plurality of computing devices that have executed the particular software application includes: receiving, at the server computing device, first AEI for the particular software application from a first computing device of the plurality of computing devices; receiving, at the server computing device, second AEI for the particular software application from a first computing device of the plurality of computing devices; taking an intersection of the first AEI and the second AEI using the server computing device; and determining the composite AEI based on the intersection of the first AEI and second AEI using the server computing device.

Clause 10—The method of any one of Clauses 7-9, where determining the composite AEI from the plurality of computing devices that have executed the particular software application includes: receiving, at the server computing device, first AEI for the particular software application from a first computing device of the plurality of computing devices; receiving, at the server computing device, second AEI for the particular software application from a first computing device of the plurality of computing devices; determining one or more counts of one or more respective software methods in the list of software methods based on the first AEI and the second AEI using the server computing device; and determining the composite AEI based on the one or more counts using the server computing device.

Clause 11—The method of any one of Clauses 7-10, where determining the composite AEI from the plurality of computing devices that have executed the particular software application includes: receiving, at the server computing device, first AEI for the particular software application via a package manager on a first computing device of the plurality of computing devices; determining whether to update the composite AEI using the first AEI using the server computing device; and after determining to update the composite AEI, updating the composite AEI based on the first AEI using the server computing device.

Clause 12—The method of any one of Clauses 7-11, where determining the composite AEI from the plurality of computing devices that have executed the particular software application includes: determining whether a particular computing device of the plurality of computing devices that has explicitly authorized transmission of AEI for the particular software application; after determining that the particular computing device of the plurality of computing devices that has explicitly authorized transmission of AEI for the particular software application, requesting AEI for the particular software application from the particular computing device; and receiving the requested AEI for the particular software application from the particular computing device.

Clause 13—The method of any one of Clauses 7-12, where determining the composite AEI from the plurality of computing devices that have executed the particular software application includes: determining a number of computing devices that have provided AEI for the particular software application using the server computing device; determining a request rate for additional AEI for the particular software application based on the number of computing devices that have provided AEI using the server computing device; and generating one or more requests for additional AEI for the particular software application based on the request rate using the server computing device.

Clause 14—The method of any one of Clauses 1-13, where determining the composite AEI includes: determining static profiling information for the particular software application using one or more profiling heuristics; and aggregating the static profiling information into the composite AEI.

Clause 15—The method of any one of Clauses 1-14, where the composite AEI further includes information about one or more application program interfaces that are utilized by the particular software application.

Clause 16—The method of Clause 15, where the particular software application is executable by at least a first version of an operating system and a second version of an operating system, where the first version of the operating system does not support a first application program interface utilized by the particular software application, where the second version of the operating system does support the first application programming interface, and where extracting particular AEI related to the particular software application from the composite AEI includes: extracting first information for validating the particular software application related to the first version of the operating system from the composite AEI, where the first information for validating the particular software application includes information that the first application program interface is not supported by the first version of the operating system; and extracting second information for validating the particular software application related to the second version of the operating system from the composite AEI, where the second information for validating the particular software application includes information that the first application program interface is supported by the second version of the operating system.

Clause 17—A computing device, including: one or more processors; and data storage including at least computer-executable instructions stored thereon that, when executed by the one or more processors, cause the computing device to perform functions including the method of any one of Clauses 1-16.

Clause 18—A non-transitory computer readable medium having stored thereon instructions, that when executed by one or more processors of a computing device, cause the computing device to perform functions including the method of any one of Clauses 1-16.

Clause 19—An apparatus, including: means for performing the method of any one of Clauses 1-16.

Clause 20—A system, including: a first computing device, including: one or more first processors; and first data storage including at least computer-executable instructions stored thereon that, when executed by the one or more first processors, cause the first computing device to perform first functions that include: sending a request to provide a software package that includes software for a particular software application to a server computing device; and the server computing device, including: one or more server processors; and server data storage including at least computer-executable instructions stored thereon that, when executed by the one or more server processors, cause the server computing device to perform server functions including the method of any one of Clauses 1-17.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method comprising:
sending, to a server computing device by a first computing device, a request to provide a software package for a particular software application;
receiving, from the server computing device by the first computing device, a software package that includes the particular software application and particular application execution information (AEI),
wherein the particular AEI is extracted from composite AEI that comprises a composite list of software methods for at least the particular software application,
wherein the composite list of software methods comprises data about software methods that were executed during past executions of the particular software application by at least one computing device other than the server computing device and other than the first computing device, and
wherein the particular AEI provides at least one compiler hint for indicating to compile a first software method of the software methods before runtime of the particular software application and to compile a second software method of the software methods during runtime of the particular software application; and
compiling, by the first computing device based on the at least one compiler hint, the first software method before runtime of the particular software application and the second software method of the software methods during runtime of the particular software application.

2. The method of claim 1, wherein the first software method comprises a frequently-executed software method, and wherein the compiler hint for indicating to compile the first software method comprises a compiler hint for indicating to compile the frequently-executed software method before runtime of the particular software application.

3. The method of claim 1, wherein the second software method comprises an initialization software method, and wherein the compiler hint for indicating to compile the second software method comprises a compiler hint for indicating to compile the initialization software method during runtime of the particular software application.

4. The method of claim 1, wherein the particular AEI comprises fingerprint information for the particular software application, the fingerprint information including:
information identifying the particular software application, information identifying a particular version of the particular software application, and information about an operating system used to execute the particular software application.

5. The method of claim 4, wherein the composite AEI comprises AEI for a plurality of versions of the particular software application, wherein the composite list of software methods is part of a composite list of software, wherein the composite list of software includes data about one or more software methods for each of the plurality of versions of the particular software application, and wherein the AEI related to the particular software application is based on selected AEI extracted from at least the composite list of software of the composite AEI, wherein extraction of the selected AEI is based on version information in the fingerprint information.

6. The method of claim 1, wherein the composite list of software methods is part of a composite list of software, wherein the composite list of software comprises data about one or more software methods executed upon starting the particular software application.

7. The method of claim 1, wherein the composite list of software methods is part of a composite list of software, wherein the composite list of software further comprises data about one or more software classes utilized by the particular software application.

8. The method of claim 1, wherein the composite AEI further comprises information including at least one of: class hierarchy information related to the particular software application, information about memory used during execution of the particular software application, information about power consumed during execution of the particular software application, devirtualization information related to the particular software application, information about hardware of a computing device executing the particular software application, information related to dependencies between operating system versions and application program interfaces (APIs), information about how frequently a particular method is invoked from a particular calling location of the particular software application, information about how frequently a particular branch of a control statement of the particular software application is followed, information about one or more program variables in the particular software application, information about a number of iterations of a repetitive software structure are performed by the particular software application, or information about values of control variables of a repetitive software structure of a software application.

9. The method of claim 1, wherein the composite AEI is determined based on a plurality of computing devices that have executed the particular software application.

10. The method of claim 9, wherein the composite AEI is determined based on a union of a first AEI for the particular software application and a second AEI for the particular software application.

11. The method of claim 9, wherein the composite AEI is determined based on an intersection of a first AEI for the particular software application and a second AEI for the particular software application.

12. The method of claim 9, wherein the composite AEI is determined based on one or more counts of one or more respective software methods of the software methods of the particular application based on a first AEI for the particular software application and a second AEI for the particular software application.

13. The method of claim 9, wherein the composite AEI is determined based on at least a sum of data from a first AEI for the particular software application and a second AEI for the particular software application.

14. The method of claim 9, wherein the composite AEI is determined through a process comprising:

sending, to the server computing device, first AEI for the particular software application via a package manager on the first computing device of the plurality of computing devices, wherein the first AEI is used to determine whether to update the composite AEI.

15. The method of claim 9, wherein the composite AEI is determined by:

determining a number of computing devices that have provided AEI for the particular software application using the server computing device;

determining a request rate for additional AEI for the particular software application based on the number of computing devices that have provided AEI using the server computing device; and generating one or more requests for additional AEI for the particular software application based on the request rate using the server computing device.

16. The method of claim 1, wherein the composite AEI is determined through aggregating static profiling information into the composite AEI, wherein the static profiling information is determined using one or more profiling heuristics.

17. The method of claim 1, wherein the composite AEI further comprises information about one or more application program interfaces that are utilized by the particular software application.

18. The method of claim 17, wherein the particular software application is executable by at least a first version of an operating system and a second version of an operating system, wherein the first version of the operating system does not support a first application program interface utilized by the particular software application, wherein the second version of the operating system does support the first application program interface, wherein the particular AEI is determined based on first information for validating the particular software application related to the first version of the operating system from the composite AEI, wherein the first information for validating the particular software application includes information that the first application program interface is not supported by the first version of the operating system, and wherein the particular AEI is determined based on second information for validating the particular software application related to the second version of the operating system from the composite AEI, wherein the second information for validating the particular software application includes information that the first application program interface is supported by the second version of the operating system.

19. A first computing device comprising:
one or more processors; and
data storage including at least computer-executable instructions stored thereon that, when executed by the one or more processors, cause the first computing device to perform functions comprising:
sending, to a server computing device by the first computing device, a request to provide a software package for a particular software application;
receiving, from the server computing device by the first computing device, a software package that includes the particular software application and particular application execution information (AEI),
wherein the particular AEI is extracted from composite AEI that comprises a composite list of software methods for at least the particular software application,
wherein the composite list of software methods comprises data about software methods that were executed during past executions of the particular software application by at least one computing device other than the server computing device and other than the first computing device, and
wherein the particular AEI provides at least one compiler hint for indicating to compile a first software method of the software methods before runtime of the particular software application and to compile a second software method of the software methods during runtime of the particular software application; and
compiling, by the first computing device based on the at least one compiler hint, the first software method before runtime of the particular software application and the second software method of the software methods during runtime of the particular software application.

20. A non-transitory computer readable medium having stored thereon instructions, that when executed by one or more processors of a first computing device, cause the first computing device to perform functions comprising:
sending, to a server computing device by the first computing device, a request to provide a software package for a particular software application;
receiving, from the server computing device by the first computing device, a software package that includes the particular software application and particular application execution information (AEI),
wherein the particular AEI is extracted from composite AEI that comprises a composite list of software methods for at least the particular software application,
wherein the composite list of software methods comprises data about software methods that were executed during past executions of the particular software application by at least one computing device other than the server computing device and other than the first computing device, and
wherein the particular AEI provides at least one compiler hint for indicating to compile a first software method of the software methods before runtime of the particular software application and to compile a second software method of the software methods during runtime of the particular software application; and
compiling, by the first computing device based on the at least one compiler hint, the first software method before runtime of the particular software application and the second software method of the software methods during runtime of the particular software application.

* * * * *